(12) United States Patent
Muto et al.

(10) Patent No.: US 10,418,151 B2
(45) Date of Patent: Sep. 17, 2019

(54) ENAMEL RESIN-INSULATING LAMINATE, INVERTER SURGE-RESISTANT INSULATED WIRE USING THE SAME AND ELECTRIC/ELECTRONIC EQUIPMENT

(71) Applicants: FURUKAWA ELECTRIC CO., LTD., Tokyo (JP); FURUKAWA MAGNET WIRE CO., LTD., Tokyo (JP)

(72) Inventors: Daisuke Muto, Tokyo (JP); Makoto Oya, Tokyo (JP); Keiichi Tomizawa, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 310 days.

(21) Appl. No.: 14/806,359

(22) Filed: Jul. 22, 2015

(65) Prior Publication Data

US 2015/0325333 A1    Nov. 12, 2015

Related U.S. Application Data

(63) Continuation of application No. PCT/JP2014/052574, filed on Feb. 4, 2014.

(30) Foreign Application Priority Data

Feb. 7, 2013   (JP) ................... 2013-022742

(51) Int. Cl.
*B32B 7/02*    (2019.01)
*H01B 7/02*    (2006.01)
(Continued)

(52) U.S. Cl.
CPC ............ *H01B 7/02* (2013.01); *H01B 3/306* (2013.01); *H01B 3/308* (2013.01); *H01B 7/29* (2013.01);
(Continued)

(58) Field of Classification Search
CPC .................................................. H01B 13/065
See application file for complete search history.

(56) References Cited

U.S. PATENT DOCUMENTS 4,000,362 A     12/1976  Kawaguchi et al.
5,192,834 A *    3/1993  Yamanishi ........... H01B 7/0233
                                                174/110 F
(Continued)

FOREIGN PATENT DOCUMENTS

CN     102782773 A    11/2012
CN     102844822 A    12/2012
(Continued)

OTHER PUBLICATIONS

MIL-DTL-17/128B Specification, Published Feb. 25, 2005.*
(Continued)

*Primary Examiner* — Maria V Ewald
*Assistant Examiner* — Zachary M Davis
(74) *Attorney, Agent, or Firm* — Birch, Stewart, Kolasch & Birch, LLP

(57) ABSTRACT

An inverter surge-resistant insulated wire comprising a conductor and an enamel resin-insulating laminate that has a foamed region including cells and a non-foamed region including no cells on at least one surface of the foamed region on the conductor, wherein the foamed region is configured such that a non-cell layer including no cells has cell layers formed of closed cells on both surface sides of the non-cell layer, a thickness of the non-cell layer is larger than a thickness of a partition wall among the closed cells, and 5 to 60% of a thickness of the foamed region, and at least 10 the cell layer in the foamed region is formed of a thermosetting resin; an inverter surge-resistant insulated wire having a conductor and the enamel resin-insulating laminate; and electric/electronic equipment.

14 Claims, 3 Drawing Sheets

(a)

(b)

(51) Int. Cl.
*H01B 7/29* (2006.01)
*H02K 3/30* (2006.01)
*H01B 3/30* (2006.01)
*H01B 13/06* (2006.01)
*H01F 5/06* (2006.01)

(52) U.S. Cl.
CPC ............ *H01B 13/065* (2013.01); *H02K 3/30* (2013.01); *H01F 5/06* (2013.01); *Y10T 428/2495* (2015.01); *Y10T 428/24975* (2015.01); *Y10T 428/2935* (2015.01)

(56) References Cited

U.S. PATENT DOCUMENTS

| | | | |
|---|---|---|---|
| 2007/0181334 A1 | 8/2007 | Lee et al. | |
| 2008/0128154 A1 | 6/2008 | Faust et al. | |
| 2009/0020310 A1* | 1/2009 | Witthoft | H01B 11/1839 174/102 R |
| 2009/0176961 A1 | 7/2009 | Kikuchi et al. | |
| 2009/0226720 A1 | 9/2009 | Kikuchi et al. | |
| 2009/0294151 A1* | 12/2009 | Li | H01B 13/14 174/110 SR |
| 2011/0226508 A1* | 9/2011 | Aoi | C08L 81/02 174/120 SR |
| 2012/0279752 A1* | 11/2012 | Oya | H01B 3/305 174/110 SR |
| 2012/0285724 A1 | 11/2012 | Oya et al. | |
| 2013/0014971 A1* | 1/2013 | Muto | H01B 3/301 174/110 SR |
| 2014/0354394 A1 | 12/2014 | Oya et al. | |

FOREIGN PATENT DOCUMENTS

| | | | | |
|---|---|---|---|---|
| JP | 36-21623 B1 | | 11/1961 | |
| JP | 7-31944 B2 | | 4/1995 | |
| JP | 2005-203334 A | | 7/2005 | |
| JP | 2008-226772 A | | 9/2008 | |
| JP | 2008226772 A | * | 9/2008 | |
| JP | 2009-212034 A | | 9/2009 | |
| JP | 4473916 B2 | | 6/2010 | |
| JP | 2012-113836 A | | 6/2012 | |
| JP | 2012-224714 A | | 11/2012 | |
| JP | 2012-234625 A | | 11/2012 | |
| TW | 201140620 A1 | | 11/2011 | |
| WO | WO 2011118717 A1 | * | 9/2011 | ............ H01B 3/301 |
| WO | WO 2011138934 A1 | * | 11/2011 | ............ H01B 3/305 |
| WO | WO 2013/133333 A1 | | 9/2013 | |

OTHER PUBLICATIONS

Taiwanese Office Action and Search Report, dated Dec. 23, 2015, for Taiwanese Application No. 103103984, along with English translations.
Chinese Office Action and Search Report, dated Feb. 29, 2016, for Chinese Application No. 201480001309.0, with an English translation.
Chinese Office Action and Search Report dated Oct. 10, 2016 for corresponding Application No. 201480001309.0, with an English translation thereof.
International Search Report, issued in PCT/JP2014/052574, dated Mar. 18, 2014.
Extended European Search Report dated Sep. 21, 2016, for European Application No. 14749364.7.

* cited by examiner (a)

(b)

(c)

(d)

ENAMEL RESIN-INSULATING LAMINATE, INVERTER SURGE-RESISTANT INSULATED WIRE USING THE SAME AND ELECTRIC/ELECTRONIC EQUIPMENT

CROSS-REFERENCE TO RELATED APPLICATIONS

This application is a continuation of PCT/JP2014/052574 filed on Feb. 4, 2014 which claims priority on Japanese Patent Application No. 2013-022742 filed on Feb. 7, 2013, the subject matter of which is incorporated herein by reference in their entirety.

TECHNICAL FIELD

The present invention relates to an enamel resin-insulating laminate, an insulated wire using the same and electric/electronic equipment.

BACKGROUND ART

In electric and electronic equipment in recent years, specifically, a radio-frequency printed board or inverter-related equipment, for example, a fast switching device, an inverter motor or an electric equipment coil for a transformer or the like, demands have been made for further improving various kinds of performance, for example, heat resistance, mechanical properties, chemical properties, electric properties and reliability in comparison with a conventional product. For such electric and electronic equipment, an insulated wire, which is an enameled wire, has been mainly used as a magnet wire. For a polymer insulating material used for the insulated wire, a low relative dielectric constant and high heat resistance together with high insulation properties have been demanded.

In particular, in the insulated wire such as an enameled wire to be used as the magnet wire for electric and electronic equipment for space use, electric and electronic equipment for aircraft use, electric and electronic equipment for nuclear power use, electric and electronic equipment for energy use, electric and electronic equipment for vehicle use, demands have been made for a high partial discharge inception voltage and also excellent insulation performance under high temperature as required properties for the insulation properties, and excellent thermal aging-resistant properties under high temperature as one of required properties for heat resistance.

By the way, inverters have been installed in many types of electric and electronic equipment, as an efficient variable-speed control unit. However, inverters are switched at a frequency of several kHz to tens of kHz, to cause a surge voltage at every pulse thereof. Inverter surge is a phenomenon that reflection occurs at a breakpoint of impedance, for example, at a starting end, a termination end, or the like of a connected wire in the propagation system, followed by applying a voltage up to twice as high as the inverter output voltage. In particular, an output pulse occurred due to a high-speed switching device, such as an IGBT, is high in steep voltage rise. Accordingly, even if a connection cable is short, the surge voltage is high, and voltage decay due to the connection cable is also low. As a result, a voltage almost twice as high as the inverter output voltage occurs.

As described above, since a voltage almost twice as high as the inverter output voltage is applied in inverter-related equipment, demands have been made for minimizing an inverter surge deterioration of the enameled wire (also referred to as insulated wire), which is one of the materials constituting the coils of those electric and electronic equipment.

In general, partial discharge deterioration means a phenomenon in which the following deteriorations of the electrical insulating material occur in a complicated manner: molecular chain breakage deterioration caused by collision with charged particles that have been generated by partial discharge (discharge at a portion in which fine void defect exists); sputtering deterioration; thermal fusion or thermal decomposition deterioration caused by local temperature rise; and chemical deterioration caused by ozone generated due to discharge, and the like. The electrical insulating materials which actually have been deteriorated by partial discharge show reduction in the thickness.

It has been believed that inverter surge deterioration of an insulated wire also proceeds by the same mechanism as in the case of general partial discharge deterioration. Namely, inverter surge deterioration of an enameled wire is a phenomenon in which partial discharge occurs in the insulated wire due to the surge voltage with a high peak value, which occurs at the inverter, and the coating of the insulated wire causes partial discharge deterioration as a result of the partial discharge; in other words, the inverter surge deterioration of an enameled wire is high-frequency partial discharge deterioration.

Insulated wires that are able to withstand several hundred volts of surge voltage have been demanded for the recent electric and electronic equipment. That is, there is a need for insulated wires that have a partial discharge inception voltage of 500 V or more. Herein, the partial discharge inception voltage is a value that is measured by a commercially available apparatus called partial discharge tester. Measurement temperature, frequency of the alternating current voltage to be used, measurement sensitivity, and the like are values that may vary as necessary, but the above-mentioned value is an effective value of the voltage at which partial discharge occurs, which is measured at 25° C., 50 Hz, and 10 pC.

When the partial discharge inception voltage is measured, a method is used in which the most severe condition possible in the case where the insulated wire is used as a magnet wire is envisaged, and a specimen shape is formed which can be observed in between two closely contacting insulated wires. For example, in the case of an insulated wire having a circular cross-section, two insulated wires are brought into linear contact by spirally twisting the wires together, and a voltage is applied between the two insulated wires. Alternatively, in the case of an insulated wire having a rectangular cross-section, use is made of a method of bringing two insulated wires into planar contact through the planes, which are the long sides of the insulated wires, and applying a voltage between the two insulated wires.

In order to obtain an insulated wire that does not cause partial discharge, which means having a high partial discharge inception voltage, so as to prevent the deterioration of the insulated layer (also referred to as "enamel layer") of the insulated wire caused by the partial discharge, it is thought to utilize a method of using a resin having low specific permittivity in the enamel layer or increasing the thickness of the enamel layer.

An attempt has been actually made on decreasing a relative dielectric constant of an enamel resin (Patent Literatures 1 and 2). However, the relative dielectric constant of the resin or the insulating layer as described in Patent Literatures 1 and 2 is only 3 to 4. In order to adjust the partial discharge inception voltage of the insulated wire using the resin or the insulating layer to 1 kV or more (effective value), experience shows that a thickness of the insulating layer is required to be adjusted to 100 µm or more, and room for a further improvement is left in view of the partial discharge inception voltage.

In addition, to thicken the insulating film, the number of times for passing through a baking furnace increases in a production process thereof, whereby making a film composed of copper oxide on a copper conductor surface thicker, this in turn, causing lowering of adhesion between the conductor and the backed enamel layer. For example, in the case of obtaining an enamel layer with thickness 100 µm or more, the number of passing through the baking furnace exceeds 20 times. It has been known that if this number of passages exceeds times, the adhesive force between the conductor and the enamel layer is conspicuously lowered.

It is also thought to utilize a method of increasing the thickness that can be formed by a single baking step, in order not to increase the number of passing through the baking furnace. However, this method has a drawback that the solvent of the varnish dose not completely vaporize and remains in the enamel layer as voids.

In order to increase a thickness of an insulation coating, an attempt has also been made on arranging a coating resin outside an enameled wire using a thermoplastic resin having a low relative dielectric constant (Patent Literatures 3 and 4). However, the relative dielectric constant of a synthetic resin for forming an insulating layer as used in Patent Literature 3 is at a level same as the level described above. Even if the insulating layer of an insulated wire is formed using the synthetic resin described in Patent Literature 3, the performance is far from fully satisfactory in view of the partial discharge inception voltage, the insulation performance and thermal aging resistance under high temperature.

To solve the problems, an attempt has been made on applying a thermosetting resin having cells to an insulation coating (Patent Literatures 5 to 8). However, even if the thermosetting resins described above are used for an insulating film, room for a further improvement is left in view of any one of the partial discharge inception voltage, the dielectric breakdown properties and the heat resistance.

CITATION LIST

Patent Literatures

Patent Literature 1: Japanese Patent No. 4473916
Patent Literature 2: JP-A-2012-234625 ("JP-A" means unexamined published Japanese patent application)
Patent Literature 3: JP-B-7-031944 ("JP-B" means examined Japanese patent publication)
Patent Literature 4: JP-A-2005-203334
Patent Literature 5: JP-B-36-21623
Patent Literature 6: JP-A-2009-212034
Patent Literature 7: JP-A-2012-113836
Patent Literature 8: JP-A-2012-224714

SUMMARY OF INVENTION

Technical Problem

The present invention is contemplated for providing an inverter surge-resistant insulated wire (also referred to simply as an insulated wire) and electric and electronic equipment that exhibit a high partial discharge inception voltage and dielectric breakdown properties, and also have excellent thermal aging-resistant properties, and an enamel resin-insulating laminate that has a small dielectric constant, and is preferably used for this insulated wire.

Solution to Problem

The present inventors diligently continued to conduct study in order to solve the above-described problems, and as a result, found that, in an insulated wire in which an enamel resin-insulating laminate having cells incorporated thereinto is arranged as an insulating layer, a non-foamed region is laminated on at least one surface of the foamed region having a cell layer formed of a thermosetting resin, and simultaneously a thickness of a non-cell layer included in the foamed region is set up to a specific range in the enamel resin-insulating laminate, and thus a low dielectric constant of the enamel resin-insulating laminate is achieved, and all of a partial discharge inception voltage, a dielectric breakdown voltage and thermal aging resistance can be improved. The present invention has been completed based on this finding.

That is, the above-described problems can be solved by the following means.

(1) An enamel resin-insulating laminate that has a foamed region including cells and a non-foamed region(s) including no cells on at least one surface of the foamed region, and is shaped into a flat plate form or cylindrical form, wherein the foamed region is configured such that a non-cell layer including no cells has cell layers having cells on both surface sides of the non-cell layer, wherein a thickness of each non-cell layer is larger than a thickness of a partition wall among the cells, and 5 to 60% of a thickness of the foamed region, and wherein at least the cell layer in the foamed region is formed of a thermosetting resin.

(2) The enamel resin-insulating laminate described in the above item (1), wherein a relative dielectric constant at 200° C. of the enamel resin-insulating laminate is 3.0 or less.

(3) The enamel resin-insulating laminate described in the above item (1) or (2), wherein a thickness of the enamel resin-insulating laminate is 40 µm or more, and a thickness of at least one of the non-foamed regions is 10 µm or more.

(4) The enamel resin-insulating laminate described in any one of the above items (1) to (3), wherein a maximum cell diameter of the cells in a thickness direction is 20 µm or less.

(5) The enamel resin-insulating laminate described in any one of the above items (1) to (4), wherein the enamel resin-insulating laminate has a surface layer formed of a resin having a tensile elasticity at 25° C. of 1 GPa or more.

(6) The enamel resin-insulating laminate described in any one of the above items (1) to (5), wherein the foamed region includes at least one kind of thermosetting resin selected from a polyamideimide resin and a polyimide resin.

(7) The enamel resin-insulating laminate described in any one of the above items (1) to (6), wherein the non-foamed region includes at least one kind of thermosetting resin selected from a polyimide resin, a polyamideimide resin, a polyesterimide resin, a polyetherimide resin and a polyimidehydantoin-modified polyester resin.

(8) The enamel resin-insulating laminate described in any one of the above items (5) to (7), wherein the surface layer includes at least one kind of thermoplastic resin selected from a polyether ether ketone resin, a thermoplastic polyimide resin, a polyphenylene sulfide resin, a polyesterimide resin and a polyamide resin.

(9) The enamel resin-insulating laminate described in any one of the above items (1) to (8), comprising at least one kind of particles selected from alumina, silica and titania.

(10) An inverter surge-resistant insulated wire, comprising: a conductor; and
the enamel resin-insulating laminate described in any one of the above items (1) to (9) as an insulation coating on the periphery of the conductor or a coating formed on the conductor.
(11) The inverter surge-resistant insulated wire described in the above item (10), wherein the non-foamed region is arranged on a peripheral surface side.
(12) Electric/electronic equipment, comprising the inverter surge-resistant insulated wire described in the above item (10) or (11).
(13) A motor, comprising the inverter surge-resistant insulated wire described in the above item (10) or (11).
(14) A transformer, comprising the inverter surge-resistant insulated wire described in the above item (10) or (11).

Advantageous Effects of Invention

The enamel resin-insulating laminate (hereinafter, referred to as "shaped object" in several cases) of the present invention is small in a dielectric constant, and when the laminate is used as an insulating layer of the insulated wire, the laminate can significantly contribute to an improvement in a partial discharge inception voltage, dielectric breakdown properties and thermal aging-resistant properties.

Moreover, the inverter surge-resistant insulated wire and the electric and electronic equipment according to the present invention in which the enamel resin-insulating laminate of the present invention is provided as the insulating layer are high in partial discharge inception voltage as well as dielectric breakdown voltage and have excellent thermal aging-resistant properties.

Other and further features and advantages of the invention will appear more fully from the following description, appropriately referring to the accompanying drawings.

DESCRIPTION OF EMBODIMENTS

Figure 1:
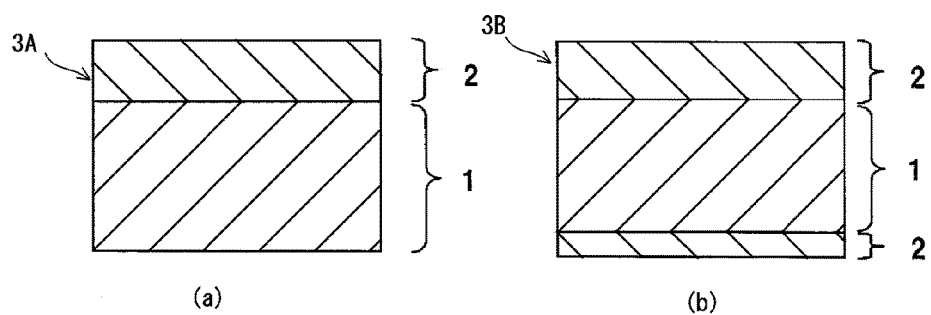
FIG. 1 is a cross-sectional view showing an embodiment of the enamel resin-insulating laminate of the present invention.

The enamel resin-insulating laminate of the present invention is a flat plate-shaped or cylindrically shaped object having a foamed region and a non-foamed region on at least one surface of the foamed region, and satisfies the following conditions (1) to (3), and preferably further satisfies at least one among the following conditions (4) to (11).

The enamel resin-insulating laminate having such a configuration according to the present invention can reduce a dielectric constant while suppressing an increase of porosity, and is excellent in insulating properties, and also in heat resistance. Accordingly, the enamel resin-insulating laminate of the present invention has the insulation properties, and is preferably used as an insulating layer of the insulated wire.

(1) The foamed region is configured such that a non-cell layer including no cells has cell layers formed of closed cells on both surface sides of the non-cell layer.
(2) The thickness of the non-cell layer is larger than the thickness of a partition wall among the closed cells, and 5 to 60% of the thickness of the foamed region.
(3) At least the cell layer in the foamed region is formed of a thermosetting resin.
(4) The relative dielectric constant at 200° C. of the enamel resin-insulating laminate is 3.0 or less.
(5) The thickness of the enamel resin-insulating laminate is 40 µm or more, and the thickness of at least one of the non-foamed regions is 10 µm or more.
(6) The maximum cell diameter of the closed cells in a thickness direction is 20 µm or less.
(7) The enamel resin-insulating laminate has a surface layer formed of a resin having a tensile elasticity at 25° C. of 1 GPa or more.
(8) The foamed region includes at least one kind of thermosetting resin selected from a polyamideimide resin and a polyimide resin.
(9) The non-foamed region includes at least one kind of thermosetting resin selected from a polyimide resin, a polyamideimide resin, a polyesterimide resin, a polyetherimide resin and a polyimidehydantoin-modified polyester resin.
(10) The surface layer includes at least one kind of thermoplastic resin selected from a polyether ether ketone resin, a thermoplastic polyimide resin, a polyphenylene sulfide resin, a polyesterimide resin and a polyamide resin.
(11) The enamel resin-insulating laminate includes at least one kind of particles selected from alumina, silica and titania.

As mentioned above, the enamel resin-insulating laminate of the present invention is the flat plate-shaped or cylindrically shaped object having the foamed region and the non-foamed region, and a structure, a shape and so forth other than the above are not particularly limited. For example, so long as the enamel resin-insulating laminate is a flat plate form or cylindrical form (also referred to as a tubular form), a cross-sectional shape perpendicular to an axis line of the enamel resin-insulating laminate is not particularly restricted, and specific examples include a rectangular form, a circular form and an elliptical form. Moreover, the non-foamed regions may be arranged on both surfaces of the foamed region.

The enamel resin-insulating laminate of the present invention will be explained, with reference to the drawings.

Figure 2:
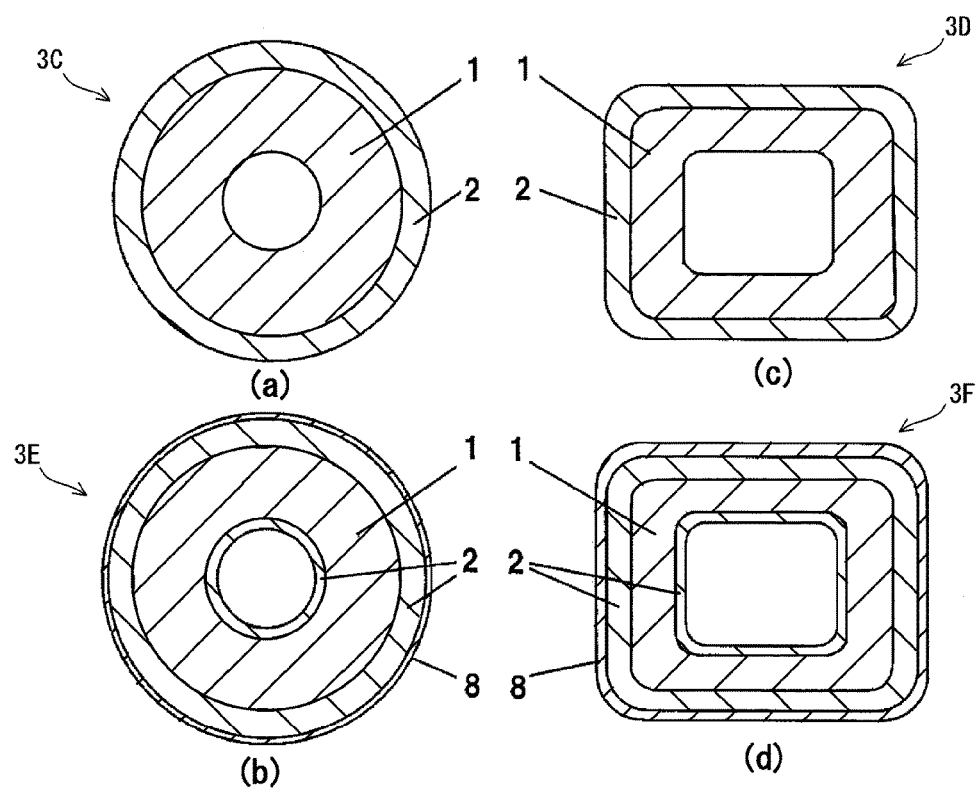
FIG. 2 is a cross-sectional view showing another embodiment of the enamel resin-insulating laminate of the present invention.

Examples of preferred embodiments of the enamel resin-insulating laminate of the present invention are shown in FIG. 1 and FIG. 2, but the enamel resin-insulating laminate of the present invention is not limited to these embodiments.

Specifically, enamel resin-insulating laminate 3A whose cross-sectional view is shown in FIG. 1(a), the insulated wire being one embodiment of the insulated wire according to the present invention, is shaped into a flat plate form, and has foamed region 1 and non-foamed region 2 laminated on one surface of foamed region 1.

Enamel resin-insulating laminate 3B whose cross-sectional view is shown in FIG. 1(b), the insulated wire being another embodiment of the insulated wire according to the present invention, is shaped into a flat plate form, and has foamed region 1 and non-foamed regions 2 laminated on both surfaces of foamed region 1. One of two non-foamed regions 2 is shaped, as shown in FIG. 1(*b*), so as to have a thickness larger than a thickness of the other region.

Enamel resin-insulating laminate 3C whose cross-sectional view is shown in FIG. 2(*a*), the insulated wire being yet another embodiment of the insulated wire according to the present invention, is shaped into a cylindrical shape having a circular form in a cross section, and has foamed region 1 and non-foamed region 2 concentrically laminated on the outer surface (also referred to as the outer periphery) of foamed region 1.

Enamel resin-insulating laminate 3E whose cross-sectional view is shown in FIG. 2(*b*), the insulated wire being still another embodiment of the insulated wire according to the present invention, is similar to enamel resin-insulating laminate 3C shown in FIG. 2(*a*) except that the laminate E also has non-foamed region 2 on the inner surface of foamed region 1, and surface layer 8 on the peripheral surface of non-foamed region 2 laminated on the outer surface of foamed region 1.

Enamel resin-insulating laminate 3D whose cross-sectional view is shown in FIG. 2(*c*), the insulated wire being still another embodiment of the insulated wire according to the present invention, is similar to enamel resin-insulating laminate 3C shown in FIG. 2(*a*) except that the laminate 3D is shaped into a cylindrical shape having a rectangular form in a cross section. In addition, "corner" of the enamel resin-insulating laminate is provided with a chamfer.

Enamel resin-insulating laminate 3F whose cross-sectional view is shown in FIG. 2(*d*), the insulated wire being still another embodiment of the insulated wire according to the present invention, is similar to enamel resin-insulating laminate 3D shown in FIG. 2(*c*) except that the laminate 3F has also non-foamed region 2 on the inner surface of foamed region 1, and surface layer 8 on the peripheral surface of non-foamed region 2 laminated on the outer surface of foamed region 1.

In the Figures shown above, the same reference symbols respectively mean the same members, and further description will not be repeated herein.

(Foamed Region)

Foamed region 1 that forms the enamel resin-insulating laminate of the present invention includes cells, and has a thickness larger than a thickness of non-foamed region 2 as described later, and functions as so-called "base layer." The foamed region is formed in a flat plate form or cylindrical form.

Figure 3:
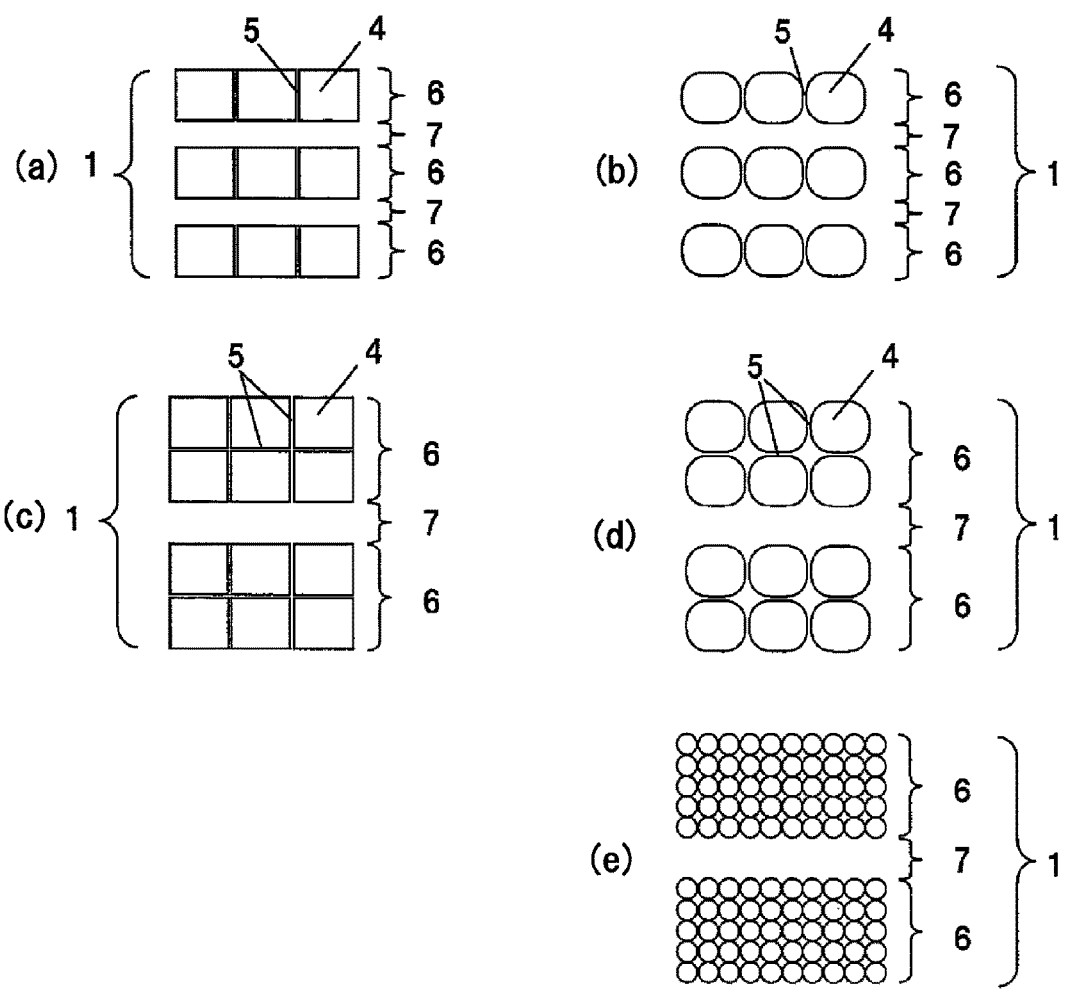
FIG. 3 is a cross-sectional schematic view showing the foamed region in the enamel resin-insulating laminate of the present invention in detail.

In the present invention, as shown in FIG. 3, foamed region 1 is configured, on both surface sides of the flat plate form or cylindrical form, such that non-cell layer 7 including no cells has cell layers 6 formed of closed cells on both surface sides of non-cell layer 7. Foamed region 1 is a region composed of the two outermost cell layers placed on both surface sides thereof. Foamed region 1 may have cell layers 6 and non-cell layer 7 interposed between cell layers 6.

In the present invention, foamed region 1 has, on both surface sides of foamed region 1, cell layers 6 having closed cells 4, and non-cell layer 7 interposed between these cell layers 6. Thus, if foamed region 1 has a three-layered structure in which two cell layers 6 and one non-cell layer 7 are laminated, configuration other than the above is not particularly limited. For example, cell layers 6 may have two cell layers (also referred to as a surface side cell layer) 6 to be arranged on both surface sides of foamed region 1, and also at least one layer of cell layer (also referred to as an internal cell layer) to be arranged therebetween. Moreover, non-cell layers 7 may have a plurality of layers so long as the layers are interposed between two cell layers 6 adjacent in a lamination direction. More specifically, the foamed region of the present invention may have a three-layered structure in which the non-cell layer is arranged between two surface cell layers, or may have an n-layered structure (n represents an odd number and preferably 5 to 21) in which the non-cell layers and the internal cell layers are alternately laminated between two surface cell layers. For example, foamed regions having a five-layered structure are shown in FIG. 3(*a*) and FIG. 3(*b*).

In the invention, when attention is focused on the non-cell layer, it can be said that foamed region 1 is configured such that a non-cell layer including no cells has cell layers 6 formed of closed cells on both surface sides of non-cell layer.

In addition, a thickness of non-cell layer 7 included in foamed region 1 (total thickness when the region 1 has a plurality of non-cell layers 7) is larger than a thickness of partition wall 5 among the closed cells, and becomes 5 to 60% of a thickness of foamed region 1. If non-cell layer 7 has such a thickness, a relative dielectric constant can be effectively reduced while suppressing an increase of a volume ratio (hereinafter, porosity) of cells 4 of foamed region 1. As a result, the insulating properties and mechanical properties such as tensile strength of the enamel resin-insulating laminate can be improved.

More specifically, the foamed region in the present invention has the non-cell layer in one or more layers and the cell layer in two or more layers, and a thickness ratio of each layer is set to the above-mentioned range. Specifically, if the thickness of the foamed region is taken as T, and the total of thickness of all non-cell layers existing in the foamed region is taken as t, a value of t/T is set to 0.05 to 0.60. The thickness of the non-cell layer is preferably 25 to 50% based on the thickness of the foamed region, more specifically, the above-mentioned thickness ratio t/T is particularly preferably 0.25 to 0.50 in view of capability of further improving the insulating properties and the mechanical properties.

Cell layers 6 that configure foamed region 1 are arranged on both surface sides of foamed region 1, namely, as the surface layer, and have the cells.

The cells included in cell layers 6 are separated by the partition walls, and they are closed cells 4 which do not communicate with surface open cells opened to the surface of foamed region 1, and so long as the cells do not communicate with the surface open cells, the cells may communicate with cells existing in the vicinity. In the present invention, cell layer 6 may have closed cells 4, and also the open cells communicating with the surface open cells, and a ratio thereof is preferably 50% or less. A ratio of existence of the open cells is determined as described below. That is, a cross section of cell layer 6 is observed using a scanning electron microscope (SEM), the number of the open cells communicating with the surface open cells and the number of the closed cells are counted, and the ratio is expressed in terms of percentage obtained by dividing the number of the open cells by the total of both numbers.

Thus, cell layer 6 is formed of an aggregate of the cells, particularly, closed cells 4, and partition walls 5 as a skeleton, and at least one closed cells 4 should be present in a direction of thickness of cell layer 6. For example, cell layers 6 shown in FIGS. 3(*a*) and 3(*b*) each have one closed cells 4 in a thickness direction, cell layers 6 shown in FIGS. 3(*c*) and 3(*d*) each have two closed cells 4 in a thickness direction, and cell layer 6 shown in FIG. 3(*e*) has a plurality of closed cells 4, specifically, five closed cells 4 in a thickness direction.

Closed cells 4 may have a rectangular form, an elliptical form or a circular form in the cross section. In view of reducing the dielectric constant, closed cells 4 preferably have a transversely flat elliptical form. In view of the insulating properties of the enamel resin-insulating laminate, particularly occurrence of partial discharge within the cells, a maximum cell diameter of closed cells 4 in cell layer 6 in a thickness direction is preferably 20 µm or less, more preferably 10 µm or less, and particularly preferably 5 µm or less. The maximum cell diameter of closed cells 4 is not particularly specified, but is practically 1 nm or more. The maximum cell diameter of closed cells 4 can be determined by observing the cross section of cell layer 6 using a scanning electron microscope (SEM), measuring the maximum cell diameters of ten arbitrarily selected closed cells 4, and calculating an arithmetic mean value of measured values.

The partition walls of cell layers 6 exist among a plurality of closed cells 4 to form cell layer 6 as the so-called skeleton. The thickness of the partition wall is not particularly limited as long as the shape of cell layer 6 can be maintained, but is preferably 1 µm or less, and more preferably 100 nm or less in view of reducing the relative dielectric constant. The lower limit is not particularly specified, but is practically 1 nm or more. The thickness of the partition wall can be examined by observing the cross section of cell layer 6 at a magnification of 3,000 or more using a scanning electron microscope (SEM). In the present invention, a mean value of thicknesses of partition walls 5 in ten arbitrarily selected positions is taken as the thickness of partition wall 5. In addition, the thickness of partition wall 5 is taken as a minimum distance between most adjacent two closed cells 4 so that the thickness can be unambiguously determined even by the shape of the cell, a dispersion state thereof or the like. For example, in cell layer 6 shown in FIG. 3, the thickness of partition wall 5 is a minimum distance between adjacent two closed cells 4 along a plane of cell layer 6, namely, a distance on a straight line connecting the centers of the two closed cells 4, and is not a minimum distance between closed cells 4 adjacent in a direction crossing with the plane of cell layer 6.

The thickness of each of cell layers 6 is not limited as long as the above-mentioned condition (2) is satisfied, but is practically 200 µm or less, and in view of uniformity of foam formation, preferably 50 µm or less. Among them, in an application to the insulated wire, the thickness is preferably 10 µm or less, and particularly preferably 5 µm or less. The lower limit of the thickness is not particularly specified, but is practically 1 µm. The thickness of cell layer 6 can be examined by observing a cross section of foamed region 1 at a magnification of 1,000 or more using a scanning electron microscope (SEM). In addition, a boundary of cell layers 6 upon measuring the thickness of cell layer 6 is taken as a line connecting vertices of each of closed cells 4 when closed cells 4 are dispersed in a planar manner as shown in FIG. 3. On the other hand, when the closed cells are dispersed in a random manner in a thickness direction, the boundary of the cell layers is determined as a line which passes through a vertex of a closed cell placed on the outermost side (upper side) in a direction perpendicular to the thickness direction, and a vertex of a closed cell placed on the innermost side (lower side) in the direction perpendicular to the thickness direction. In this case, each of the vertices is perpendicular to the thickness direction and the line is perpendicular to the thickness direction.

When a plurality of cell layers 6 exist, the total thickness of cell layers 6 is not limited as long as the above-mentioned condition (2) is satisfied, but in view of securing the relative dielectric constant and the mechanical properties of the insulated wire, the thickness is preferably 10 to 200 µm, and more preferably 20 to 100 µm.

Non-cell layer 7 is defined to be, if the enamel resin-insulating laminate is in the flat plate form, a layer continuously existing in an identical plane form between cell layers 6, and if the enamel resin-insulating laminate is in the cylindrical form, a layer continuously existing in a longitudinal direction (axial direction) between cell layers 6, and the layer having a thickness larger than the thickness of partition wall 5 that separates closed cells 4. When non-foamed layer 7 is thinner than the thickness of partition wall 5, identification between non-foamed layer 7 and partition wall 5 cannot be practically made, and also the above-mentioned effect on reducing the relative dielectric constant may not be exhibited in several cases.

This non-cell layer 7 is a so-called solid layer substantially including no cells, as shown in FIG. 3. "Substantially including no cells" herein includes not only a case where the layer includes no cells at all, but also a case where the layer includes cells to the extent that the layer has no influence on properties of the foamed region. For example, in an observation surface obtained by observing the cross section of the non-foamed layer 6 using a scanning electron microscope (SEM), the layer may include the cells as long as the number is one piece/cm$^2$ or less.

The thickness of each of non-cell layers 7 is determined in relation to the thickness of foamed region 1 as mentioned above, and in view of reduction of the dielectric constant, the thickness is preferably 10 µm or less, and more preferably 5 µm or less. The lower limit of the thickness of non-cell layer 7 is not particularly specified, but is practically 100 nm. The thickness of non-cell layer 7 can be examined by observing the cross section of foamed region 1 at a magnification of 1,000 or more using a scanning electron microscope (SEM). In addition, a boundary of non-cell layers 7 upon measuring the thickness of non-cell layer 7 is similar to the boundary of cell layers 6.

When a plurality of non-cell layers 7 exist, the total thickness of non-cell layers 7 is not limited as long as the above-mentioned condition (2) is satisfied, but in view of ensuring the relative dielectric constant and the mechanical properties of the insulated wire, the thickness is preferably 0.1 to 200 µm, and more preferably 1 to 100 µm.

In the thus formed foamed region 1 in which cell layer 6 and non-cell layer 7 are laminated, the porosity is suppressed by existence of non-cell layer 7, and the region 1 is appropriately set up such that the laminate has a desired relative dielectric constant. In the present invention, the porosity of foamed region 1 in the whole enamel resin-insulating laminate is preferably 10% or more, more preferably 20% or more, and particularly preferably 25% or more in view of an effect on reducing the relative dielectric constant. On the other hand, in view of mechanical strength, the porosity is preferably 70% or less, more preferably 60% or less, and particularly preferably 50% or less. The porosity of foamed region 1 can be calculated, from a density d of the enamel resin-insulating laminate and a density $d_0$ of a resin that forms the enamel resin-insulating laminate, according to an expression: $\{1-(d/d_0)\} \times 100 [\%]$. In the present invention, a value measured by a hydrostatic method is used as each density.

In foamed region 1 having such a configuration, at least cell layer 6, and preferably cell layer 6 and non-cell layer 7 are formed of a thermosetting resin. If the region 1 is formed of the thermosetting resin, the region 1 is excellent in mechanical strength, and therefore an effect of having difficulty in collapse of the cells is obtained. This thermosetting resin preferably has a glass transition temperatures of 150° C. or higher. If the thermosetting resin has the glass transition temperature of 150° C. or higher, the resin has high heat resistance, and foamed region 1 is hard to soften under high temperature, in which the cells do not collapse, and the relative dielectric constant becomes hard to rise. The glass transition temperature of the thermosetting resin is preferably 200° C. or higher, more preferably 230° C. or higher, and particularly preferably 250° C. or higher in view of the relative dielectric constant. When the thermosetting resin has a plurality of glass transition temperatures, the lowest temperature is taken as the glass transition temperature.

The thermosetting resin is not particularly limited, and specific examples preferably include polyamideimide or polyimide. In view of the relative dielectric constant and the heat resistance, polyimide is particularly preferred. As a commercially available thermosetting resin, for example, a polyamideimide resin (PAI) varnish (trade name: HI-406, manufactured by Hitachi Chemical Co., Ltd.), a polyimide resin (PI) varnish (trade name: U Imide. manufactured by Unitika Ltd.) or the like can be used. These thermosetting resins can be used alone in one kind, or in combination of two or more kinds thereof.

Non-cell layer 7 is preferably formed of the above-mentioned thermosetting resin, but may be formed of a different resin, upon satisfying the heat resistance, having a low relative dielectric constant and improved mechanical strength. Specifically, a modified material of polyamideimide or polyimide, of which low relative dielectric constant and mechanical strength are improved, can be used. Thus, the relative dielectric constant of the enamel resin-insulating laminate can further be reduced, or tensile properties or mechanical strength such as abrasion properties of the enamel resin-insulating laminate can be improved. In addition, such a resin having the low relative dielectric constant and improved mechanical strength preferably has a glass transition temperature of 150° C. or higher.

To the thermosetting resin and resin having the low relative dielectric constant and improved mechanical strength as mentioned above, various kinds of additives may be added to the extent that the heat resistance and the insulation properties are not significantly influenced. Specific examples include a resin other than the above-mentioned thermosetting resin and fine particles that develop partial discharge resistance as described later.

Foamed region 1 can be formed by appropriately applying onto a suitable base material (a conductor when the insulated wire is directly produced) a plurality of times a varnish obtained by dissolving the above-mentioned thermosetting resin into several kinds of specific solvents, and baking the resultant material. As a method for applying the resin varnish, a conventional method may be applied, and in order to form foamed region 1 into a flat plate form, specific examples include a comma coating system, a lip coating system and a curtain coating system. The base materials onto which these resin varnishes are applied are baked in a baking furnace according to the conventional method. Specific baking conditions depend on a shape of the furnace to be used, or the like, and if an about 5 m hot-air circulating horizontal enamel baking furnace is applied, baking can be attained by setting the conditions to 10 to 180 seconds as a transit time in the range of 300 to 500° C.

On the other hand, in order to shape the foamed region into a cylindrical shape, specific examples include a method of using varnish application-use dies having a form similar to a cross-sectional shape of the conductor, and a method using dies referred to as "universal dies" formed into parallel crosses if the cross-sectional shape of the conductor is quadrangular. The base materials onto which these resin varnishes are applied are baked in a baking furnace according to the conventional method. Specific baking conditions depend on a shape of the furnace to be used, or the like, and if an about 5 m natural convection-type vertical furnace is applied, baking can be attained by setting the conditions to 10 to 90 seconds as a transit time in the range of 400 to 600° C.

In order to form a multi-layered structure foamed-region having cell layer 6 and non-cell layer 7 by application and baking in this way, the above-mentioned varnish is first improved to prepare a foaming varnish by which a size of the cells, the thickness of the partition walls separating the closed cells or the like can be controlled, and the foaming varnish is applied onto the base material, and then the resultant material was baked and foamed under conditions of 10 to 90 seconds as the transit time at 400 to 600° C. to form cell layer 6. Subsequently, a varnish for forming non-cell layer 7 is applied onto formed cell layer 6, and the resultant material is baked, or as described later, the foaming varnish is applied thereonto and the resultant material is baked to form non-cell layer 7, and the predetermined number of cell layers 6 and non-cell layers 7 are formed in a similar manner hereinafter.

In addition, as the foamed region, a plurality of cell layers 6 and non-cell layers 7 are prepared beforehand, as mentioned above, and then these may be laminated.

In particular, specific examples of a method for efficiently preparing non-cell layer 7 including no cells using the foaming varnish include a method of lowering a varnish temperature during applying the varnish. Although a detailed reason is not known, this phenomenon is presumably due to cell growth inhibition caused by partially suppressing evaporation by heating. Lowering of the varnish temperature can be appropriately adjusted by applying a technique of suppressing evaporation efficiency such as suppression of air speed in the baking furnace. For example, if the varnish temperature is decreased to 15° C. or the air speed is suppressed to 5 m/second, non-cell layer 7 can be efficiently prepared even by using the foaming varnish.

As a method of forming cell layer 6, the following method is cited. Firstly, a foaming varnish is prepared by mixing a thermosetting resin, a specific organic solvent, and two or more kinds of solvents, preferably, three or more kinds of solvents including at least one kind of high boiling solvent. Secondly, the foaming varnish is applied around a base material and baked to obtain cell layer 6. The foaming varnish may be applied onto the base material directly or by interposing another resin layer between the base material and the varnish.

The specific organic solvent for the foaming varnish used in cell layer 6 acts as a solvent for dissolving the thermosetting resin. This organic solvent is not particularly limited as long as the organic solvent does not inhibit the reaction of the thermosetting resin, and examples thereof include amide-based solvents such as N-methyl-2-pyrrolidone (NMP), N,N-dimethylacetamide (DMAC), dimethylsulfoxide, and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; and sulfone-based solvents such as sulfolane. Among these, in view of high solubility, high reaction promotion properties or the like, amide-based solvents or urea-based solvents are preferred; and in view of having no hydrogen atom that is apt to inhibit a crosslinking reaction due to heating or the like, N-methyl-2-pyrrolidone, N,N-dimethylacetamide, N,N-dimethylethyleneurea, N,N-dimethylpropyleneurea or tetramethylurea is further preferred, and N-methyl-2-pyrrolidone is particularly preferred. The boiling point of this organic solvent is preferably 160° C. to 250° C., and more preferably 165° C. to 210° C.

The high boiling solvent that can be used for cell formation is a solvent having a boiling point of preferably 180° C. to 300° C., and more preferably 210° C. to 260° C. Specific examples that can be used for cell formation include diethylene glycol dimethyl ether, triethylene glycol dimethyl ether, diethylene glycol dibutyl ether, tetraethylene glycol dimethyl ether, and tetraethylene glycol monomethyl ether. From the viewpoint of having a smaller fluctuation in the cell size, triethylene glycol dimethyl ether is more preferred. In addition to the above solvents, the examples include dipropylene glycol dimethyl ether, diethylene glycol ethyl methyl ether, dipropylene glycol monomethyl ether, diethylene glycol diethyl ether, diethylene glycol monomethyl ether, diethylene glycol butyl methyl ether, tripropylene glycol dimethyl ether, diethylene glycol monobutyl ether, ethylene glycol monophenyl ether, triethylene glycol monomethyl ether, triethylene glycol butyl methyl ether, polyethylene glycol dimethyl ether, polyethylene glycol monomethyl ether, and propylene glycol monomethyl ether.

As a high boiling solvent, one kind thereof may be used, but at least two kinds thereof are preferably used in combination in that an effect of cell generation over a wide temperature range is obtained. Preferred combinations of at least two kinds of the high boiling solvents include tetraethylene glycol dimethyl ether with diethylene glycol dibutyl ether, diethylene glycol dibutyl ether with triethylene glycol dimethyl ether, triethylene glycol monomethyl ether with tetraethylene glycol dimethyl ether, and triethylene glycol butyl methyl ether with tetraethylene glycol dimethyl ether. More preferred combinations include diethylene glycol dibutyl ether with triethylene glycol dimethyl ether, and triethylene glycol monomethyl ether with tetraethylene glycol dimethyl ether.

The high boiling solvent for cell formation preferably has a boiling point higher than the boiling point of the specific organic solvent for dissolving the thermosetting resin, and when the solvent is added in one kind to the foaming varnish, the boiling point is preferably higher by 10° C. or more than the boiling point of the specific organic solvent for the thermosetting resin. Furthermore, it is understood that in the case where one kind of the high boiling solvent is used, the high boiling solvent takes the role of both a cell nucleating agent and a foaming agent. On the other hand, in the case where two or more kinds of the high boiling solvents are used, the solvent having the highest boiling point acts as a foaming agent, and a high boiling solvent for cell formation having an intermediate boiling point acts as a cell nucleating agent. The solvent having the highest boiling point preferably has a boiling point that is higher by 20° C. or more, and more preferably by 30° C. to 60° C., than the specific solvent. The high boiling solvent for cell formation having the intermediate boiling point may have a boiling point that is intermediate between the boiling point of the solvent that acts as a foaming agent and the boiling point of the specific solvent, and preferably has a difference in boiling point of 10° C. or more from the boiling point of the foaming agent. In the case where the high boiling solvent for cell formation having the intermediate boiling point has a higher solubility for the thermosetting resin than the solvent that acts as a foaming agent, uniform cells can be formed after baking of the foaming varnish. In the case where the two or more kinds of the high boiling solvents are used, the use ratio of the high boiling solvent having the highest boiling point to the high boiling solvent having the intermediate boiling point is, for example, preferably from 99/1 to 1/99 in terms of mass ratio, and more preferably from 10/1 to 1/10 in terms of easiness of cell formation.

(Non-Foamed Region)

Next, the non-foamed region will be described in detail, referring to FIG. 1. The enamel resin-insulating laminate of the present invention has the above-mentioned foamed region 1 as well as non-foamed region 2 on at least one surface of this foamed region 1. Non-foamed region 2 may be arranged on both surfaces of foamed region 1 depending on use and required properties.

This non-foamed region 2 is a region substantially including no cells, namely, a so-called solid region, and is different from the above-mentioned non-cell layer 7 in that it is arranged outside of foamed region 1. Herein, "substantially including no cells" includes not only a case where the region includes no cells at all, but also a case where the region includes the cells to the extent that the region has no effect on the properties of the enamel resin-insulating laminate. For example, in an observed surface obtained by observing the cross section of non-foamed region 2 using a scanning electron microscope (SEM), the region may include the cells as long as the number is one piece/cm$^2$ or less.

This non-foamed region 2 may be formed in a single layer or a plurality of layers, and the number of layers is appropriately selected, for example, depending on the thickness, productivity or the like.

Non-foamed region 2 may be provided as the surface layer of the enamel resin-insulating laminate, and may have the surface layer on the surface of non-foamed region 2. As surface layer 8, the so-called solid layer formed of the resin having a tensile elasticity (tensile modulus of elasticity) at 25° C. of 1 GPa or more is preferred. If the enamel resin-insulating laminate has such surface layer 8, the mechanical properties such as the tensile strength and abrasion resistance of the enamel resin-insulating laminate are improved. A thickness of the surface layer is not particularly limited, but in view of the tensile strength and the abrasion resistance, the thickness is preferably 5 μm or more, and more preferably 10 to 40 μm.

The tensile elasticity can be measured by dynamic viscoelasticity measurement (DMS). Specifically, measurement is carried out by using a tensile mode, frequency of 10 Hz and strain amount of 1/1000, while changing a measuring temperature at an elevating rate of 5° C./min. The control mode, the frequency, the strain amount, the measuring temperature and the like at the time of measurement is changeable, if needed.

In view of the mechanical properties and the heat resistance, non-foamed region 2 is preferably formed of at least one kind of thermosetting resin selected from the group consisting of a polyimide resin, a polyamideimide resin, a polyesterimide resin, a polyetherimide resin and a polyimidehydantoin-modified polyester resin. A polyimide resin or a polyamideimide resin is more preferred, and a polyimide resin is particularly preferred in view of the heat resistance and the low relative dielectric constant.

Non-foamed region 2 is preferably formed of the above-mentioned thermosetting resin, but if the following tensile elasticity is satisfied and the heat resistance is not significantly adversely affected, the region 2 may be formed of a thermoplastic resin or a mixture with the above-mentioned thermosetting resin. As such a thermoplastic resin, specifically, one satisfying the following tensile elasticity and heat resistance from the resins described below is preferred. Specific examples of the thermoplastic resin include a fluorocarbon resin, polyether ether ketone (including modified polyether ether ketone), thermoplastic polyimide, polyphenylene sulfide, polyesterimide, polysulfone, polyether sulfone, polyetherimide and polyphenyl sulfone. Among them, in view of excellent chemical resistance, a fluorocarbon resin, polyether ether ketone, thermoplastic polyimide, polyphenylene sulfide or the like is preferred. Among them, in view of high tensile elasticity and excellent mechanical properties, polyether ether ketone, thermoplastic polyimide or polyphenylene sulfide is particularly preferred.

Specific examples of commercially available thermoplastic resins include polyether ether ketone (PEEK) (trade name: KetaSpire KT-820, manufactured by Solvay Specialty Polymers LLC), a modified polyether ether ketone resin (modified-PEEK, trade name: AveSpire AV-650, manufactured by Solvay Specialty Polymers LLC), a thermoplastic polyimide resin (Thermoplastic PI, trade name: AURUM PL450C, manufactured by Mitsui Chemicals, Inc.) and a polyphenylene sulfide resin (PPS, trade name: FZ-2100, manufactured by DIC Corporation).

On the other hand, as the thermoplastic resin that forms the surface layer, among the resins described above, a polyether ether ketone resin, a thermoplastic polyimide resin, a polyphenylene sulfide resin, a polyesterimide resin, a polyamide resin and so forth that are excellent in solvent resistance are preferred. Among them, a polyether ether ketone resin, a modified polyether ether ketone resin, a thermoplastic polyimide resin or a polyphenylene sulfide resin that is excellent in heat resistance and the mechanical properties and low in the dielectric constant is particularly preferred.

The resin to be used for the non-foamed region preferably has a tensile elasticity in the range of 25 to 250° C. of 100 MPa or more in view of maintaining the mechanical properties under high temperature. The resin satisfying the conditions is appropriately selected from the resins described above. The tensile elasticity is measured as mentioned above.

In the case where non-foamed region 2 or surface layer 8 is formed of the thermoplastic resin or the mixture of the thermosetting resin and the thermoplastic resin, when the thermoplastic resin includes a crystalline thermoplastic resin, a degree of crystallinity in the non-foamed region formed of the thermoplastic resin is preferably increased in view of suppressing a decrease in the elastic modulus near the glass transition temperature to allow exhibition of the mechanical properties under high temperature. Specifically, the degree of crystallinity is preferably 50% or more, more preferably 70% or more, and particularly preferably 80% or more. The degree of crystallinity herein is expressed in terms of a value that can be measured using differential scanning calorimetry (DSC), and shows a degree at which regular arrangement is made in the crystalline resin. Specifically, adequate quantity of the non-foamed region is took and weighed and temperature thereof is elevated, for example, at the rate of 5° C./min. An amount of heat (amount of melting heat) due to melting that is observed at the region more than 300° C. and an amount of heat (amount of crystallization heat) due to crystallization that is observed at round 150° C. are calculated and a difference of the heat amount in which the crystallization heat amount is deducted from the melting heat amount, with respect to the melting heat amount, is defined as the crystallinity. This calculation formula is shown below.

Calculation formula: the film crystallinity (%)=[(the amount of melting heat−the amount of crystallization heat)/(the amount of melting heat)]×100     Formula:

Non-foamed region 2 is formed of the thermosetting resin, the mixture of the thermosetting resin and the thermoplastic resin, or the thermoplastic resin as mentioned above, and the surface layer may be formed of a material identical with the material of non-foamed region 2, or a resin that is different from each other.

Moreover, the resin that forms non-foamed region 2 and surface layer 8 may be a blend with any other resin, an elastomer, various kinds of additives, or the like within the range in which neither the heat resistance nor the insulation properties are influenced. Specific examples of the additives include a wax or a lubricant that improves surface slipping nature, and the fine particles that develop the partial discharge resistance as described later.

Non-foamed region 2 may be formed using the thermosetting resin or the thermoplastic resin, and, on the periphery of foamed region 1, applying and baking the resin varnish, or may be formed by extrusion molding of the resin, or can be formed by winding a tape-shaped one.

Conditions during extrusion molding, for example, extrusion temperature conditions, are appropriately set up depending on the thermoplastic resin to be used. To give one example of preferred extrusion temperature, specifically, the extrusion temperature is set up to a temperature higher by 40 to 60° C. than the melting point thereof in order to adjust melt viscosity to a level suitable for extrusion coating. Thus, if non-foamed region 2 is formed by extrusion molding, the enamel resin-insulating laminate is not needed to be passed through the baking furnace upon forming non-foamed region 2 in a production process, and therefore such molding has an advantage of allowing suppression of thermal deterioration of the resin that forms the foamed region, or suppression of a decrease in adhesion force between the conductor and the enamel resin-insulating laminate as caused by oxidization of the conductor.

The enamel resin-insulating laminate having the foamed region and the non-foamed region of the present invention as described above may include the fine particles that develop the partial discharge resistance, for example, for the purpose of improving the partial discharge resistance. Specific examples of such fine particles include fine particles of alumina, silica or titania, and at least one kind of fine particles selected therefrom is preferred, and titania is particularly preferred. In view of exhibiting the partial discharge resistance, a content of the fine particles is preferably 10% by mass or more, more preferably 20% by mass or more, and particularly preferably 30% by mass or more in the total mass of the enamel resin-insulating laminate. On the other hand, if the content of the fine particles excessively increases, the enamel resin-insulating laminate becomes brittle to cause a decrease in flexibility, and therefore the content is preferably adjusted to 50% or less.

In view of the flexibility in a similar manner, the primary particle diameter of the fine particles is preferably 100 nm or less, more preferably 50 nm or less, and particularly preferably 20 nm or less. The lower limit is not limited, but is practically 1 nm.

The fine particles may be wholly contained into the enamel resin-insulating laminate, namely, the foamed region and the non-foamed region, at an identical or different content, or may be partially contained into the enamel resin-insulating laminate, namely, the foamed region or the non-foamed region. When the fine particles are partially contained into the enamel resin-insulating laminate, in view of effectively exhibiting high partial discharge resistance, the fine particles are more preferably contained into an outer non-foamed region, particularly, the non-foamed region to be arranged on an outer surface when formed into the insulated wire.

In the enamel resin-insulating laminate of the present invention, in view of the partial discharge inception voltage, a thickness of the whole enamel resin-insulating laminate, namely, the total thickness obtained by combining the thickness of the foamed region and the thickness of the non-foamed region is preferably 40 μm or more, more preferably 60 μm or more, and particularly preferably 80 μm or more. In this way, the partial discharge inception voltage can be increased due to a synergistic effect with the above-mentioned relative dielectric constant. The upper limit of the thickness is not limited, but is practically 1 mm.

In the enamel resin-insulating laminate of the present invention, in view of the dielectric breakdown properties and the mechanical properties such as the tensile strength and the abrasion resistance, the thickness of the non-foamed region (at least one non-foamed region when the laminate has a plurality of non-foamed regions) only needs to be 2 μm or more, and 10 μm or more is preferred, 15 μm or more is further preferred, and 20 μm or more is particularly preferred. If the thickness of the non-foamed layer becomes large, the relative dielectric constant of the enamel resin-insulating laminate increases, and therefore the thickness of the non-foamed region is restricted by the relative dielectric constant (3.0 or less) of the enamel resin-insulating laminate. Therefore, the thickness is restricted by the porosity of the enamel resin-insulating laminate in a strict sense, but the thickness of the non-foamed region is practically preferably 50 μm or less. Based on the thickness of the whole enamel resin-insulating laminate, the thickness is preferably 70% or less, and more preferably 50% or less, and particularly preferably 20 to 40% of the thickness of the whole enamel resin-insulating laminate.

In the enamel resin-insulating laminate of the present invention, in view of allowing an improvement in all of the partial discharge inception voltage, the dielectric breakdown voltage and thermal aging resistance when the laminate is used as the insulating layer of the insulated wire, the relative dielectric constant at 200° C. is preferably 3.0 or less, more preferably 2.7 or less, and particularly preferably 2.5 or less. The lower limit of the relative dielectric constant is not particularly limited, but is practically 1.5.

A temperature at which the relative dielectric constant is maintained to 3.0 or less is preferably up to 230° C., and particularly preferably up to 250° C. In this way, the partial discharge inception voltage can be increased when the laminate is applied to the insulated wire, for example, and also the insulated wire can be used under higher temperature.

The relative dielectric constant of the enamel resin-insulating laminate of the present invention refers to an effective relative dielectric constant of the whole in combining the foamed region and the non-foamed region, and a value calculated from the electrostatic capacitance of the insulated wire and outer diameters of the conductor and the insulated wire.

A method for calculating the relative dielectric constant from the electrostatic capacitance of the insulated wire will be described. The electrostatic capacitance of the insulated wire can be measured using a commercially available LCR meter or the like. In the present invention, LCR High Tester (model 3532-50) manufactured by Hioki E.E Corporation is used. Measurement temperature and frequency are changed when necessary, and in the present invention, unless otherwise noted, the relative dielectric constant means a value measured under conditions of 200±1° C. and 100 Hz. Measurement is carried out at a time point at which the temperature becomes constant after the insulated wire is put in a constant temperature bath set to 200° C. In this method, the relative dielectric constant can be calculated according to the following equation 1.

$$\varepsilon r^* = Cp \cdot \text{Log}(b/a)/(2\pi\varepsilon_0) \qquad \text{Equation 1:}$$

In Equation 1, $\varepsilon r^*$ represents a dielectric constant of the enamel resin-insulating laminate, $Cp$ represents a capacitance per unit length [pF/m], a represents an outside diameter of the conductor, b represents an outside diameters of the insulated wire, $\varepsilon_0$ represents a vacuum permittivity $(8.855 \times 10^{-12} [F/m])$.

Also note that in a case where the cross-section of the insulated wire is not circular but rectangular as an example, "the dielectric constant of the insulation layer" can be calculated using a relation that capacitance Cp of the insulation layer is a sum of capacitance Cf of a flat part and capacitance Ce of a corner part (Cp=Cf+Ce). Specifically, provided that lengths of a long side and a short side of the straight-line portion of the conductor are represented by L1 and L2, respectively, a radius of curvature of the conductor corner is represented by R, and a thickness of the insulation layer is represented by T, the capacitance Cf of the flat part and the capacitance Ce of the corner part are expressed by the following equations. Using these equations, $\varepsilon r^*$ can be calculated from the observed capacitance of the insulated wire and capacitance Cp (Cf+Ce) of the insulation layer.

$$Cf = (\varepsilon r^*/\varepsilon_0) \times 2 \times (L1+L2)/T$$

$$Ce = (\varepsilon r^*/\varepsilon_0) \times 2\pi\varepsilon_0/\text{Log}\{(R+T)/R\}$$

Moreover, the relative dielectric constant of a foamed body can be determined using the following equation 2 (A. S. Windeler's equation). A calculated value thereof well agrees with the value of the relative dielectric constant of the foamed body in which the cells are uniformly distributed.

$$\frac{\varepsilon_1 - \varepsilon_r^*}{\varepsilon_1 - \varepsilon_2} = \frac{F}{100} \frac{3\varepsilon_r^*}{2\varepsilon_r^* + \varepsilon_2} \qquad \text{Equation 2}$$

In the above-described equation 2, $\varepsilon r^*$ is a relative dielectric constant of the enamel resin-insulating laminate (insulating layer of the insulated wire), $\varepsilon 1$ is a relative dielectric constant of the resin, $\varepsilon 2$ is a relative dielectric constant of air (=1) and F is a volume ratio [%] of air.

The volume ratio of air herein means a ratio of a volume of pores to a volume of the whole enamel resin-insulating laminate, and can be calculated from the density d of the enamel resin-insulating laminate and the density do of the resin that forms the enamel resin-insulating laminate according to the formula: $F=\{1-(d/do)\} \times 100[\%]$. In the present invention, as each density, a value measured by the hydrostatic weighing method (underwater substitution method) is used.

Moreover, a method can also be applied in which the enamel resin-insulating laminate and an ordinary foamed body are modeled, and the relative dielectric constant can also be calculated by applying a method using an electric field analysis. Commercially available electromagnetic field calculation software (for example, ELECTRO) can be utilized for the electric field analysis. In the present invention, the electric field in an air layer is determined according to the electric field analysis by a high-speed surface charging method in considering a laminated insulation between the enamel resin-insulating laminate and air interposed between parallel flat plate electrodes. Specifically, when a voltage between the electrodes is taken as V, an electric field in the air layer is taken as E, a thickness of the air layer is taken as d, and a thickness of the enamel resin-insulating laminate is taken as T, the relative dielectric constant εr* of the enamel resin-insulating laminate can be determined according to the following equation 3. In the present invention, the relative dielectric constant is determined on the assumption: V=1,000 [V] and d=5 [μm].

$$\varepsilon r^* = T / \{(V/E) - d\} \quad \text{Equation 3:}$$

The thus determined relative dielectric constant well agrees with the relative dielectric constant, which is determined from the electrostatic capacitance, of the insulated wire having the enamel resin-insulating laminate with a similar structure as a film.

(Insulated Wire)

The insulated wire of the present invention has the conductor and the enamel resin-insulating laminate of the present invention as an insulation coating on the periphery of the conductor or a coating formed on the conductor. The enamel resin-insulating laminate of the present invention is preferably arranged on the periphery of the conductor such that the non-foamed region serves as the peripheral surface of the insulation coating.

The insulated wire having such a configuration according to the present invention is high in partial discharge inception voltage and the dielectric breakdown voltage, and exhibits excellent thermal aging-resistant properties. Accordingly, the enamel resin-insulating laminate of the present invention is preferred as an insulating material that requires the low relative dielectric constant, the insulation properties and the heat resistance. In particular, the insulated wire having the enamel resin-insulating laminate of the present invention as an insulation coating is preferred as a heat-resistant winding wire use, and is used in various applications as described later.

As mentioned above, the insulated wire of the present invention has the conductor and the enamel resin-insulating laminate of the present invention, and a structure, shape and so forth other than the above are not particularly limited. For example, the insulated wire of the present invention may have an adhesive layer or the like between the conductor and the enamel resin-insulating laminate of the present invention.

Figure 4:
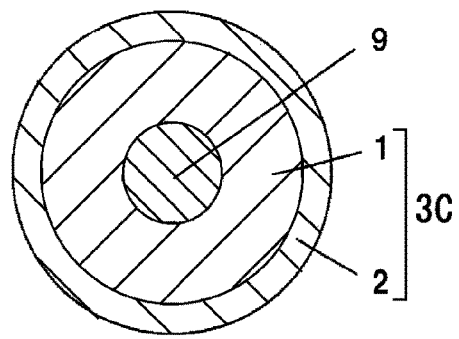
FIG. 4 is a cross-sectional view showing an embodiment of the inverter surge-resistant insulated wire of the present invention.
Figure 4:
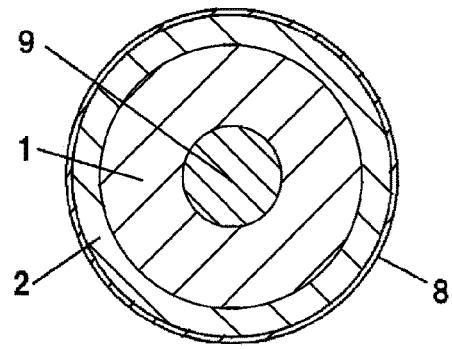
Figure 4:
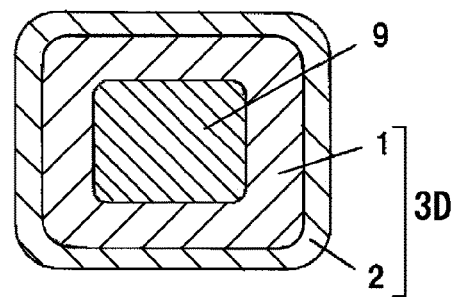
Figure 4:
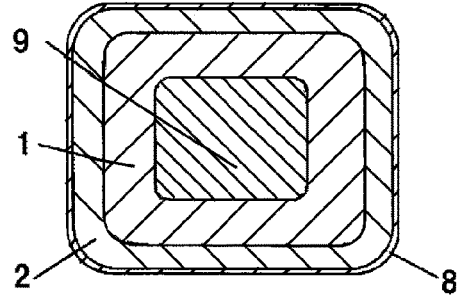

The insulated wire of the present invention will be described below, referring to drawings. Examples of preferred embodiments of the insulated wire according to the present invention are shown in FIG. 4, but the insulated wire of the present invention is not limited to the embodiments.

Specifically, the insulated wire whose cross-sectional view is shown in FIG. 4(a), the insulated wire being one embodiment of the insulated wire according to the present invention, comprises conductor 9 being circular in a cross-sectional shape and perpendicular to an axis line, and enamel resin-insulating laminate 3C as an insulation coating.

The insulated wire whose cross-sectional view is shown in FIG. 4(b), the insulated wire being another embodiment of the insulated wire according to the present invention, is similar to the insulated wire shown in FIG. 4(a) except that the insulated wire has surface layer 8.

The insulated wire whose cross-sectional view is shown in FIG. 4(c), the insulated wire being a still another embodiment of the insulated wire according to the present invention, comprises conductor 9 being rectangular in a cross-sectional shape and perpendicular to an axis line, and enamel resin-insulating laminate 3D as an insulation coating.

The insulated wire whose cross-sectional view is shown in FIG. 4(d), the insulated wire being a yet another embodiment of the insulated wire according to the present invention, is similar to the insulated wire shown in FIG. 4(c) except that the insulated wire has surface layer 8.

In the Figures shown above, the same reference symbols respectively mean the same members, and further description will not be repeated herein.

As conductor 1 that can be used in the insulated wires of the present invention, use may be made of any conductor that has been conventionally used in insulated wires. The conductor is a conductor of preferably a low-oxygen copper whose oxygen content is 30 ppm or less, and more preferably a low-oxygen copper whose oxygen content is 20 ppm or less or oxygen-free copper. When the conductor is melted by heat for the purpose of welding if the oxygen content is 30 ppm or less, voids caused by contained oxygen occur at a welded portion, the deterioration of the electric resistance of the welded portion can be prevented, and the strength of the welded portion can be secured.

The conductor preferably has a cross-sectional shape identical with the cross-sectional shape of the enamel resin-insulating laminate of the present invention, and as shown in FIG. 4, one having a desired form such as a circular form and a rectangular form in a transverse section can be used in conformity with the cross-sectional shape of the enamel resin-insulating laminate. As the cross-sectional shape of the conductor, a form by which the cross section is increased is preferred. In terms of space factor with respect to the stator slot, it is more preferred to use a conductor having a cross-sectional shape other than a circular shape, and particularly preferred to use a rectangular conductor as in shown in FIG. 4. Furthermore, in terms of suppressing partial discharge from corners, it is preferable that chamfers (radius r) are formed at four corners.

The insulated wire of the present invention preferably has the enamel resin-insulating laminate of the present invention as an insulation coating such that the non-foamed region of the enamel resin-insulating laminate of the present invention becomes the peripheral surface of the insulation coating. Such a material is satisfactory in smoothness on the surface of the insulation coating, and therefore excellent in slipping nature, and also excellent in scratch resistance such as the abrasion resistance. Further, in view of adhesion with the conductor, the insulated wire of the present invention preferably has the enamel resin-insulating laminate of the present invention in which the non-foamed region is arranged also on the inner peripheral surface in contact with the conductor, for example, enamel resin-insulating laminates 3B, 3E or 3F as an insulated coating.

The insulated wire having such a configuration according to the present invention is high in partial discharge inception voltage, and also excellent in insulation performance and thermal aging-resistant properties under high temperature, and therefore can be utilized as the insulated wire in the field in which withstand voltage properties and the heat resistance are required, for example, a winding wire for a drive motor for HV (hybrid vehicle) or EV (electric vehicle), as described later. Accordingly, by the insulated wire of the present invention, high-performance electric/electronic equipment used for motors and transformers can be provided. Specifically, the motor using the insulated wire of the present invention has the stator slot and the insulated wire of the present invention wound into the stator slot.

The insulated wire of the present invention can be produced by inserting a conductor into a preliminarily shaped enamel resin-insulating laminate of the present invention, and also can be produced by shaping the enamel resin-insulating laminate of the present invention on the peripheral surface of the conductor according to the above-mentioned method.

EXAMPLES

The present invention will be described below in more detail based on examples, but the invention is not meant to be limited by these. That is, the present invention is not construed to be limited by the above-mentioned embodiments and the following examples, and various modifications can be made within the scope of the technical matter of the present invention.

(PAI Varnish (A) for Cell Formation)

In a 2 L separable flask, a PAI varnish (HI-406 (trade name), a solution containing 33% by mass of resin component, manufactured by Hitachi Chemical Co., Ltd.) was put, and as cell-forming agents, diethylene glycol dimethyl ether (boiling point: 162° C.) and triethylene glycol dimethyl ether (boiling point: 216° C.) were added to the solution, to obtain PAI varnish (A) for cell formation.

(PAI Varnish (B) for Cell Formation)

In a 2 L separable flask, a PAI varnish (HI-406 (trade name), a solution containing 33% by mass of resin component, manufactured by Hitachi Chemical Co., Ltd.) was put, and as cell-forming agents, triethylene glycol dimethyl ether (boiling point: 216° C.) and diethylene glycol dibutyl ether (boiling point: 256° C.) were added to the solution, and dimethyl sulfoxide was further added thereto and diluted to obtain PAI varnish (B) for cell formation.

(PAI Varnish (C) for Cell Formation)

In a 2 L separable flask, a PAI varnish (HI-406 (trade name), a solution containing 33% by mass of resin component, manufactured by Hitachi Chemical Co., Ltd.) was put, and as cell-forming agents, diethylene glycol diethyl ether (boiling point: 162° C.) and triethylene glycol dimethyl ether (boiling point: 216° C.) were added to the solution, and NMP was further added thereto and diluted to obtain PAI varnish (C) for cell formation.

(PAI Varnish (D) for Cell Formation)

In a 2 L separable flask, a PAI varnish (HI-406 (trade name), a solution containing 33% by mass of resin component, manufactured by Hitachi Chemical Co., Ltd.) was put, and as a cell-forming agent, triethylene glycol dimethyl ether (boiling point: 216° C.) was added to the solution, and dimethyl sulfoxide was further added thereto and diluted to obtain PAI varnish (D) for cell formation.

(PAI Varnish (E) for Forming Non-Cell Layer 7 and Non-Foamed Region 2)

In a 2 L separable flask, a PAI varnish (HI-406 (trade name), a solution containing 33% by mass of resin component, manufactured by Hitachi Chemical Co., Ltd.) was put, and NMP was further added thereto to obtain Varnish (E) for forming non-foamed layer 7 and non-foamed region in a solution containing 16% by mass of resin component.

Example 1

In Example 1, the insulated wire shown in FIG. 4(*a*) was produced. The insulated wire had an enamel resin-insulating laminate including foamed region 1 and non-foamed region 2, foamed region 1 having double-layered cell layers 6 and single-layered non-cell layer 7 as shown in FIG. 3(*d*).

Specifically, PAI varnish (A) for cell formation was applied onto the periphery of copper wire (conductor) 9 having a diameter of 1 mm, and the resultant material was baked once at a furnace temperature of 520° C. for 20 seconds to form cell layer 6 on the conductor. Onto the periphery of the thus formed cell layer 6, PAI varnish (HI-406 (trade name), a solution containing 33% by mass of resin component, manufactured by Hitachi Chemical Co., Ltd.) was applied, and the resultant material was baked twice for 20 seconds to form non-cell layer 7, and onto the periphery of non-cell layer 7, PAI varnish (A) for cell formation was applied, and the resultant material was baked once for 20 seconds to form foamed region 1. Further, onto the periphery of foamed region 1, PAI varnish (E) was applied, and the resultant material was baked once for 20 seconds to form non-foamed region 2 on the periphery, and an enamel resin shaped object was formed on the peripheral surface of the copper wire 9 to obtain the insulated wire in Example 1.

Example 2

The insulated wire shown in FIG. 4(*a*) was produced in a manner similar to the procedure in Example 1 except that PAI varnish (C) for cell formation was baked at a furnace temperature of 500° C. in place of PAI varnish (A) for cell formation.

Example 3

The insulated wire shown in FIG. 4(*a*) was produced in a manner similar to the procedure in Example 1 except that an enamel resin-insulating laminate including foamed region 1 and non-foamed region 2 as shown in FIG. 3(*b*) was formed by baking PAI varnish (A) for cell formation three times and by baking PAI varnish (E) twice in terms of times of baking.

Example 4

PAI varnish (A) for cell formation was baked once at a furnace temperature of 530° C. for 20 seconds, and then, on the periphery thereof, PAI varnish (E) was baked four times for 20 seconds to form single-layered non-cell layer 7. The insulated wire shown in FIG. 4(*a*) was produced in a manner similar to the procedure in Example 1 except that the procedure was repeated three times to form an enamel resin-insulating laminate having a three-layered cell layer.

Example 5

PAI varnish (A) for cell formation was baked once at a furnace temperature of 540° C. for 20 seconds, and then, on the periphery thereof, PAI varnish (E) was baked twice for 20 seconds to form single-layered non-cell layer 7. The insulated wire shown in FIG. 4(*a*) was produced in a manner similar to the procedure in Example 1 except that the procedure was repeated six times to form an enamel resin-insulating laminate having a six-layered cell layer.

Example 6

PAI varnish (B) for cell formation was baked once at a furnace temperature of 510° C. for 30 seconds, and then, on the periphery thereof, PAI varnish (E) was baked once for 30 seconds to form single-layered non-cell layer 7. The insulated wire shown in FIG. 4(a) was produced in a manner similar to the procedure in Example 1 except that the procedure was repeated nine times to form an enamel resin-insulating laminate having a nine-layered cell layer.

Example 7

On the periphery of the insulated wire produced in Example 6, PAI varnish (E) was baked four times for 30 seconds to form surface layer 8 and further to form the insulated wire shown in FIG. 4(b) in which the insulated wire had an enamel resin-insulating laminate having nine-layered cell layer 6 and PAI surface layer 8 having a thickness of 10 μm.

Example 8

On the periphery of the insulated wire produced in Example 6, a PI varnish (U Imide (trade name), an NMP solution containing 25% by mass of resin component, manufactured by Unitika Ltd.) was baked four times for 30 seconds to form surface layer 8 and further to form the insulated wire shown in FIG. 4(b) in which the insulated wire had an enamel resin-insulating laminate having nine-layered cell layer 6 and PI surface layer 8 having a thickness of 22 μm.

Example 9

On the periphery of the insulated wire produced in Example 6, a thermoplastic polyimide resin (thermoplastic PI, trade name: AURUM PL450C, manufactured by Mitsui Chemicals, Inc.) was formed by extrusion molding. Extrusion conditions were in accordance with the conditions in Table 1. Thus, the insulated wire shown in FIG. 4(b) was produced, in which the insulated wire had an enamel resin-insulating laminate having nine-layered cell layer 6 and PI surface layer 8 having a thickness of 22 μm.

Example 10

Onto the periphery of the insulated wire produced in Example 6, polyetherimide (PEI) (trade name: ultem, manufactured by SABIC) dissolved in NMP was applied using dies for enamel use, and the resultant material was baked at a furnace temperature of 510° C. for 30 seconds to form an adhesive layer having a thickness of 5 μm. On the periphery thereof, a polyether ether ketone resin (PEEK, trade name: KetaSpire KT-820, manufactured by Solvay Specialty Polymers LLC) was formed by extrusion molding. Extrusion conditions were in accordance with the conditions in Table 1. Thus, the insulated wire shown in FIG. 4(b) was produced, in which the insulated wire had an enamel resin-insulating laminate having nine-layered cell layer 6 and PEEK surface layer 8 having a thickness of 35 μm.

Example 11

Onto the periphery of the insulated wire produced in Example 6, polyphenyl sulfone (PPSU, trade name: Radel R, manufactured by Solvay Advanced Polymers LLC) dissolved in NMP was applied using dies for enamel use, and the resultant material was baked at a furnace temperature of 510° C. for seconds to form an adhesive layer having a thickness of 5 μm. On the periphery thereof, a polyphenylene sulfide resin (PPS, trade name: FZ-2100, manufactured by DIC Corporation) was further formed by extrusion molding. Extrusion conditions were in accordance with the conditions in Table 1. Thus, the insulated wire shown in FIG. 4(b) was produced, in which the insulated wire had an enamel resin-insulating laminate having nine-layered cell layer 6 and PPS surface layer 8 having a thickness of 36 μm.

Example 12

PAI varnish (B) for cell formation was baked once at a furnace temperature of 510° C. for 30 seconds, and then on the periphery thereof, PAI varnish (E) was baked once for 30 seconds to form single-layered non-cell layer 7. The procedure was repeated eight times, and on the outer layer, PAI varnish (B) for cell formation was further baked once to form a foamed region. Onto the periphery of the insulated wire in which the foamed region was formed, PAI varnish (HI-406 (trade name), a solution containing 33% by mass of resin component, manufactured by Hitachi Chemical Co., Ltd.) containing 30% by mass of titania having a primary particle diameter of 15 nm (HXMT-100ZA, manufactured by TAYCA Corporation) was applied and baked six times to form non-foamed region 2, and on the periphery thereof, PAI varnish (HI-406 (trade name), a solution containing 33% by mass of resin component, manufactured by Hitachi Chemical Co., Ltd.) was applied and baked six times to form surface layer 8 and to produce an insulated wire having nine-layered cell layer 6, and a non-cell layer containing titania and having a thickness of 18 μm, and PAI surface layer 8 having a thickness of 15 μm.

Example 13

A flat plate-shaped enamel resin-insulating laminate was prepared as follows. The varnish used in Example 2 was applied onto a material prepared by fixing 20 μm copper foil (development article manufactured by Furukawa Electric Co., Ltd.) onto a 500 mm-wide glass plate. The resultant material was heated to 500° C. using a high temperature/constant humidity oven (STPH-202, manufactured by ESPEC Corporation). Heating time was adjusted to 30 seconds in the high temperature/constant humidity oven after the temperature reached 500° C. at a setup of 500° C. from charging a sample, and a cell layer was baked. Then, HI-406 diluted to a concentration of 16% was applied onto the cell layer, and the resultant material was baked in a similar manner to form a non-foamed layer. Further, a cell layer in the foamed region was formed in a similar manner to form foamed region 1. HI-406 diluted to a concentration of 20% was applied onto the surface thereof, and the resultant material was baked to form a non-foamed region and to obtain enamel resin-insulating laminate 3A in Example 13.

Comparative Example 1

Onto the periphery of copper wire 9 having a diameter of 1 mm, PAI varnish (A) for cell formation was applied, and the resultant material was baked at a furnace temperature of 510° C. to produce an insulated wire of Comparative Example 1, which had single-layered cell layer 6 but had no non-cell layer 7.

Comparative Example 2

Onto the periphery of copper wire 9 having a diameter of 1 mm, PAI varnish (B) for cell formation was applied, and the resultant material was baked at a furnace temperature of 500° C. to produce an insulated wire of Comparative Example 2, which had single-layered cell layer 6 but had no non-cell layer 7.

Comparative Example 3

Onto the periphery of copper wire 9 having a diameter of 1 mm, PAI varnish (D) for cell formation was applied, and the resultant material was baked at a furnace temperature of 505° C. to produce an insulated wire of Comparative Example 3, which had single-layered cell layer 6 but had no non-cell layer 7.

Comparative Example 4

HI-406 was used for a polyamideimide varnish that forms no cells. For 1,000 g of this resin, NMP was used as a solvent to make a 30% solution of the resin. Onto the periphery of copper wire 9 having a diameter of 1 mm, a PAI varnish was applied, and the resultant material was baked at a furnace temperature of 520° C. for 30 seconds. The procedure was repeated 15 times to produce an insulated wire of Comparative Example 4 in which the insulated wire had only a non-foamed region formed of PAI, the non-foamed region having a film thickness of 40 μm.

(Conditions of Extrusion Temperature)

The conditions of extrusion temperature of Examples 9 to 11 are shown in Table 1, respectively.

In Table 1, C1, C2 and C3 indicate three zones in which temperature-controlling in the cylinder portion of the extruder is carried out in parts, in this order from the input side of materials. Further, H indicates a head located posterior to the cylinder of the extruder. Further, D indicates a die at the end of the head.

TABLE 1

| Resin for extrusion coating | | Thermoplastic PI | PEEK | PPS |
|---|---|---|---|---|
| Conditions of extrusion temperature | C1 [° C.] | 330 | 300 | 260 |
| | C2 [° C.] | 410 | 380 | 300 |
| | C3 [° C.] | 410 | 380 | 310 |
| | H [° C.] | 420 | 390 | 320 |
| | D [° C.] | 430 | 400 | 330 |

In each of the thus produced insulated wires, measurement was carried out on a thickness ratio VT, a maximum cell diameter of closed cells 4, a thickness of a partition wall, a thickness of each cell layer 6, a thickness of each non-foamed layer 7, the total thickness and porosity of the enamel resin-insulating laminate, a thickness of non-foamed region 2, and a degree of crystallinity according to the above mentioned method, respectively. The results are shown in Table 2.

(Relative Dielectric Constant)

With regard to the relative dielectric constant (at 200° C.) of the enamel resin-insulating laminate formed in each insulated wire, the results calculated according to the above-mentioned "method for calculating the relative dielectric constant from the electrostatic capacitance of the insulated wire (equation 1)" are shown in Table 2. In addition, the relative dielectric constant substantially agreed with values calculated applying the electric field analysis (equation 3). Moreover, calculated values of the relative dielectric constant obtained applying the above-mentioned equation 2 of A. S. Windeler are shown together in Table 2.

TABLE 2

| | | Ex 1 | Ex 2 | Ex 3 | Ex 4 | Ex 5 | Ex 6 | Ex 7 |
|---|---|---|---|---|---|---|---|---|
| Foamed region | Thermosetting resin | PAI | PAI | PAI | PAI | PAI | PAI | PAI |
| | Thickness of each cell layer 6 (μm) | 10 | 22.5 | 8.3 | 10 | 2.7 | 2.8 | 2.8 |
| | Total thickness of cell layers 6 (μm) | 20 | 45 | 25 | 30 | 16 | 25 | 25 |
| | Maximum cell diameter (μm) | 10 | 21 | 10 | 5 | 3 | 3 | 3 |
| | Thickness of partition wall (μm) | 0.1 | 0.1 | 0.1 | 0.1 | 0.1 | 0.1 | 0.1 |
| | Thickness of each non-cell layer 7 (μm) | 2 | 5 | 4.5 | 12 | 4.8 | 1.9 | 1.9 |
| | Total thickness t of non-cell layers 7 (μm) | 2 | 5 | 9 | 24 | 24 | 15 | 15 |
| | Thickness of foamed region T (μm) | 22 | 50 | 34 | 54 | 40 | 40 | 40 |
| | t/T | 0.09 | 0.10 | 0.26 | 0.44 | 0.60 | 0.38 | 0.38 |
| Non-Foamed region | Thermosetting resin or thermoplastic resin | PAI | PAI | PAI | PAI | PAI | PAI | PAI |
| | Thickness (μm) | 2 | 2 | 2 | 2 | 2 | 4 | 3 |
| | Degree of crystallinity (%) | — | — | — | — | — | — | — |
| | Tensile elasticity (MPa) | 3100 | 3100 | 3100 | 3100 | 3100 | 3100 | 3100 |
| Surface layer | Thermoplastic resin | — | — | — | — | — | — | PAI |
| | Thickness (μm) | — | — | — | — | — | — | 10 |
| | Degree of crystallinity (%) | — | — | — | — | — | — | — |
| | Tensile elasticity (MPa) | — | — | — | — | — | — | 3100 |
| Enamel shaped object | Total thickness (μm) | 24 | 52 | 36 | 56 | 42 | 44 | 53 |
| | Porosity (%) | 65 | 64 | 56 | 28 | 19 | 49 | 41 |
| | Relative dielectric constant (Equation 1) | 1.5 | 1.5 | 1.8 | 2.6 | 2.9 | 2.0 | 2.2 |
| | Relative dielectric constant (Equation 2) | 1.7 | 1.7 | 2.1 | 3.1 | 3.5 | 2.3 | 2.6 |
| | Relative dielectric constant (Equation 3) | 1.5 | 1.5 | 1.8 | 2.6 | 2.9 | 2.0 | 2.2 |

| | | Ex 8 | Ex 9 | Ex 10 | Ex 11 | Ex 12 | Ex 13 |
|---|---|---|---|---|---|---|---|
| Foamed region | Thermosetting resin | PAI | PAI | PAI | PAI | PAI | PAI |
| | Thickness of each cell layer 6 (μm) | 2.8 | 2.8 | 2.8 | 2.8 | 2.8 | 20 |
| | Total thickness of cell layers 6 (μm) | 25 | 25 | 25 | 25 | 25 | 40 |
| | Maximum cell diameter (μm) | 3 | 3 | 3 | 3 | 3 | 20 |
| | Thickness of partition wall (μm) | 0.1 | 0.1 | 0.1 | 0.1 | 0.1 | 0.1 |

TABLE 2-continued

|  |  |  |  |  |  |  |  |
|---|---|---|---|---|---|---|---|
| | Thickness of each non-cell layer 7 (μm) | 1.9 | 1.9 | 1.9 | 1.9 | 1.9 | 5 |
| | Total thickness t of non-cell layers 7 (μm) | 15 | 15 | 15 | 15 | 15 | 5 |
| | Thickness of foamed region T (μm) | 40 | 40 | 40 | 40 | 40 | 45 |
| | t/T | 0.38 | 0.38 | 0.38 | 0.38 | 0.38 | 0.11 |
| Non-Foamed region | Thermosetting resin or thermoplastic resin | PAI | PAI | PAI and PEI | PAI and PPSU | PAI and titania-containing PAI | PAI |
| | Thickness (μm) | 4 | 21 | 8 | 8 | 18 | 10 |
| | Degree of crystallinity (%) | — | — | — | — | — | — |
| | Tensile elasticity (MPa) | 3500 | 3100 | 3100 | 3100 | 3100 | 3100 |
| Surface layer | Thermoplastic resin | PI | Thermoplastic PI | PEEK | PPS | PAI | — |
| | Thickness (μm) | 22 | 22 | 35 | 36 | 15 | — |
| | Degree of crystallinity (%) | — | 74 | 81 | 75 | — | — |
| | Tensile elasticity (MPa) | 3700 | 1700 | 3800 | 1600 | 3100 | — |
| Enamel shaped object | Total thickness (μm) | 66 | 83 | 83 | 84 | 73 | 55 |
| | Porosity (%) | 33 | 26 | 25 | 25 | 29 | 65 |
| | Relative dielectric constant (Equation 1) | 2.4 | 2.4 | 2.6 | 2.5 | 2.7 | 1.5 |
| | Relative dielectric constant (Equation 2) | — | — | — | — | — | 1.7 |
| | Relative dielectric constant (Equation 3) | 2.4 | 2.4 | 2.6 | 2.5 | 2.7 | 1.5 |

| | | C Ex 1 | C Ex 2 | C Ex 3 | C Ex 4 |
|---|---|---|---|---|---|
| Foamed region | Thermosetting resin | PAI | PAI | PAI | PAI |
| | Thickness of each cell layer 6 (μm) | 20 | 16 | 16 | — |
| | Total thickness of cell layers 6 (μm) | 20 | 16 | 16 | — |
| | Maximum cell diameter (μm) | 10 | 3 | 3 | — |
| | Thickness of partition wall (μm) | 0.2 | 1 | 3 | — |
| | Thickness of each non-cell layer 7 (μm) | — | — | — | — |
| | Total thickness t of non-cell layers 7 (μm) | — | — | — | — |
| | Thickness of foamed region T (μm) | 20 | 16 | 16 | — |
| | t/T | 0 | 0 | 0 | — |
| Non-Foamed region | Thermosetting resin or thermoplastic resin | — | — | — | PAI |
| | Thickness (μm) | — | — | — | 40 |
| | Degree of crystallinity (%) | — | — | — | — |
| | Tensile elasticity (MPa) | — | — | — | 3100 |
| Surface layer | Thermoplastic resin | — | — | — | — |
| | Thickness (μm) | — | — | — | — |
| | Degree of crystallinity (%) | — | — | — | — |
| | Tensile elasticity (MPa) | — | — | — | — |
| Enamel shaped object | Total thickness (μm) | 20 | 16 | 16 | 40 |
| | Porosity (%) | 65 | 52 | 20 | — |
| | Relative dielectric constant (Equation 1) | 1.8 | 2.2 | 3.3 | 4.3 |
| | Relative dielectric constant (Equation 2) | 1.9 | 2.2 | 3.3 | — |
| | Relative dielectric constant (Equation 3) | 1.8 | 2.2 | 3.3 | — |

"Ex" means Example according to the present invention.
"C Ex" means Comparative Example.

(Partial Discharge Inception Voltage (PDIV))

The partial discharge inception voltage of the insulated wires was measured, using a partial discharge tester (trade name: KPD2050, manufactured by Kikusui Electronics Corp.). A twisted pair piece prepared by twisting two insulated wires for each as produced in Examples and Comparative Examples was used, and while a sine-wave alternating voltage of 50 Hz was applied between the conductors, voltage was continuously increased at a uniform rate of 50 V/second, and a voltage (effective value) at a time point at which a partial discharge of 10 pC occurred was read. Measurement temperature was adjusted to 25±5° C. A measured value of 1.0 kV (peak value: 1414 Vp) or more was judged to be particularly excellent and expressed as "⊙", a measured value of 0.7 kV (peak value: 990 kVp) or more was judged to be excellent and expressed as "○", and a measured value of less than 0.7 kV was expressed as "x". If the evaluation is "○" or better, partial discharge is hard to occur, and partial deterioration of the insulated wire can be prevented. The results are shown in Table 3.

(Dielectric Breakdown Voltage)

With regard to the dielectric breakdown voltage, a twisted pair piece prepared by twisting two insulated wires for each as produced in Examples and Comparative Examples was used, and while a sine-wave alternating voltage of 50 Hz was applied between the conductors, voltage was continuously increased at a uniform rate of 500 V/second, detection sensitivity was set to 5 mA, and an applied voltage when a current of 5 mA or more was passed was read in terms of an effective value, and taken as the dielectric breakdown voltage. Measurement temperature was adjusted to 25±5° C. Dielectric breakdown strength (withstanding voltage value per unit thickness) determined by dividing the above-described dielectric breakdown voltage by the total thickness of the enamel resin-insulating laminate formed in the insulated wire was used for evaluation. A value of 80 kV/mm or more was judged to be particularly excellent and expressed as "⊙", a value of 50 kV/mm or more was judged to be excellent and expressed as "○", a value of 30 kV/mm or more was expressed as "Δ" and a value less than kV/mm was expressed as "x". If the evaluation is "Δ" or better, dielectric breakdown is hard to occur to exhibit high dielectric breakdown properties. The results are shown in Table 3.

(Thermal Aging-Resistant Properties (200° C.×500 Hours and 230° C.×500 Hours))

Thermal aging properties of each insulated wire produced in Examples and Comparative Examples were evaluated as follows. A twisted pair piece prepared by twisting two insulated wires for each was put in a high temperature oven set at 200° C. or 230° C., and left to stand for 500 hours, and then a voltage of 0.5 to 1.4 kV (effective value) was applied thereto for one second. Magnitude of the voltage was changed depending on the total thickness of the enamel resin-insulating laminate formed in the insulated wire, and the voltage was adjusted to be approximately 15 kV/mm. A case where no dielectric breakdown was caused at 230° C. was judged to be particularly excellent and expressed as "⊙", a case where no dielectric breakdown is caused at 200° C. was judged to be excellent and expressed as "o", and a case where the dielectric breakdown was caused in any case was expressed as "x". If the evaluation is "o" or better, the wire is excellent in thermal aging-resistant properties. The results are shown in Table 3.

(Partial Discharge Resistance)

The partial discharge resistance of each insulated wire produced in Examples and Comparative Examples was evaluated as follows. To a twisted pair piece prepared by twisting two insulated wires for each, an alternating sine-wave voltage having 1.6 kVp (peak value) and 10 kHz was applied. Test temperature was adjusted to 25±10° C. A piece in which a period of time causing the dielectric breakdown exceeded 10 hours was judged to be particularly excellent and expressed as "⊙", a piece in which the period of time exceeded 2 hours and was less than 10 hours was judged to be excellent and expressed as "o", and a piece in which the period of time was less than 2 hours was expressed as "Δ". If the evaluation is "o" or better, the wire is excellent in the partial discharge resistance. The results are shown in Table 3.

Enamel resin-insulating laminate 3A produced in Example 13 was evaluated by simulating one using a twisted pair piece in the case of the insulated wire. A flat plate sample cut out from enamel resin-insulating laminate 3A into 10 mm width×100 mm length was wound around a cylinder made from brass and having a diameter of 1 mm such that a side on which a film was formed became outside to prepare a cylindrical test specimen having a length of 100 mm. Two cylindrical test specimens were aligned so as to be brought into contact therewith, and evaluated in a manner similar to the evaluation of the above-described properties.

(Overall Evaluation)

Overall evaluation was conducted as follows.

In each of the above-described tests, a case where all of the evaluations are expressed as "⊙" or "o" was judged to be particularly excellent and expressed as "⊙" in the overall evaluation; a case where any one of the evaluations is expressed as "Δ" was expressed as "o" in the overall evaluation; and a case where any one of the evaluations is expressed as "x" was expressed as "x" in the overall evaluation. The results are shown in Table 3.

TABLE 3

|  | Ex 1 | Ex 2 | Ex 3 | Ex 4 | Ex 5 | Ex 6 | Ex 7 | Ex 8 | Ex 9 | Ex 10 | Ex 11 | Ex 12 | Ex 13 |
|---|---|---|---|---|---|---|---|---|---|---|---|---|---|
| Partial discharge inception voltage | o | ⊙ | o | o | o | o | o | ⊙ | ⊙ | ⊙ | ⊙ | o | o |
| Dielectric breakdown voltage | o | Δ | o | o | o | o | o | ⊙ | ⊙ | ⊙ | ⊙ | ⊙ | Δ |
| Thermal aging-resistant properties | ⊙ | ⊙ | ⊙ | ⊙ | ⊙ | ⊙ | ⊙ | ⊙ | ⊙ | ⊙ | o | ⊙ | ⊙ |
| Partial discharge resistance | Δ | Δ | Δ | Δ | Δ | Δ | o | o | o | o | o | ⊙ | Δ |
| Overall estimation | o | o | o | o | o | o | ⊙ | ⊙ | ⊙ | ⊙ | ⊙ | ⊙ | o |

|  | C Ex 1 | C Ex 2 | C Ex 3 | C Ex 4 |
|---|---|---|---|---|
| Partial discharge inception voltage | x | x | x | x |
| Dielectric breakdown voltage | x | x | x | ⊙ |
| Thermal aging-resistant properties | ⊙ | ⊙ | ⊙ | ⊙ |
| Partial discharge resistance | Δ | Δ | Δ | Δ |
| Overall estimation | x | x | x | x |

"Ex" means Example according to the present invention.
"C Ex" means Comparative Example.

As shown in Table 3, if the thickness of non-cell layer 7 in the enamel resin-insulating laminate is larger than the thickness of the partition wall, and is 5 to 60% of the thickness of foamed region 1, the relative dielectric constant could be decreased without accompanying an increase in the porosity, and the insulated wire was excellent in PDIV and the dielectric breakdown strength. Further, cell layer 6 in foamed region 1 was formed of the thermosetting resin (PAI), and therefore the insulated wire was excellent also in the heat resistance.

Further, if the thickness of surface layer 8 is 10 μm or more, the insulated wire was particularly excellent in dielectric breakdown strength, and the layers are made from the thermosetting resin similar to the resin in the foamed region, or the thermoplastic resin having high heat resistance, and therefore the heat resistance is not adversely affected, either. Further, the insulated wire is provided with the layer containing titania, and thus the partial discharge resistance was significantly improved.

Specifically, when comparison between Examples 1 to 5 and Comparative Examples 1 to 3 is made, a success is found to be made in decreasing the relative dielectric constant without accompanying an increase in the porosity in Examples according to the present invention. Even when a value of the relative dielectric constant was compared with the calculated value of the relative dielectric constant according to equation 2 of A. S. Windeler, the value is smaller by 10 to 15%, and an effect thereof is significant. As a result, PDIV and the dielectric breakdown strength of the insulated wire were excellent.

The thickness of surface layer 8 was 10 μm or more in Examples 7 to 11, and therefore the insulated wire was particularly excellent in the dielectric breakdown strength. In particular, the surface layer was formed using thermoplastic PI, PEEK, or PPS having the low dielectric constant, and thus a rise of the relative dielectric constant of the enamel resin-insulating laminate was suppressed, and as a result, PDIV of the insulated wire became particularly excellent. The thermoplastic PI and PEEK thereamong had the heat resistance equal to the heat resistance of the enamel resin, and thus the heat resistance of the enamel resin-insulating laminate also became particularly excellent. In addition, the maximum cell diameter of the closed cells was 20 μm or less in Examples other than Example 2, and therefore the dielectric breakdown strength was superior to the strength in Example 2.

INDUSTRIAL APPLICABILITY

An enamel resin-insulating laminate of the present invention is low in a dielectric constant and excellent in heat resistance and insulation properties, and therefore is preferred for an electric wire coating material, a radio-frequency printed circuit board or the like. In particular, an inverter surge-resistant insulated wire of the present invention in which the enamel resin-insulating laminate of the present invention is subjected to insulation coating on a conductor is high in partial discharge inception voltage and excellent also in insulation performance and thermal aging-resistant properties under high temperature, and therefore can be utilized as an insulated wire in the field in which withstand voltage properties and heat resistance are required, for example, a vehicle and also various kinds of electric and electronic equipment, specifically, inverter-related equipment, a fast switching device, an inverter motor or an electric and electronic equipment coil for a transformer or electric and electronic equipment for space use, electric and electronic equipment for aircraft use, electric and electronic equipment for nuclear power use, electric and electronic equipment for energy use and electric and electronic equipment for a vehicle. In particular, the insulated wire is preferred as a winding wire for a drive motor for HV or EV.

The inverter surge-resistant insulated wire of the present invention is used for a motor, a transformer or the like and can provide high performance electric and electronic equipment.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Foamed region
2 Non-foamed region
3A to 3F Foamed body
4 Closed cells
5 Partition wall
6 Cell layer
7 Non-foamed layer
8 Surface layer
9 Conductor

The invention claimed is:
1. An inverter surge-resistant insulated wire, comprising:
a conductor; and
an enamel resin-insulating laminate that has a foamed region including cells and a non-foamed region including no cells on at least one surface of the foamed region on the conductor,
wherein a porosity of the foamed region in the enamel resin-insulating laminate is 25% or more and 70% or less,
wherein the foamed region is configured such that a non-cell layer including no cells has cell layers having cells on both surface sides of the non-cell layer,
wherein a thickness of each non-cell layer is larger than a thickness of a partition wall among the cells, and 5 to 60% of a thickness of the foamed region,
wherein a thickness ratio t/T is from 0.09 to 0.6 when T is a thickness of the foamed region and t is a thickness of all non-cell layers in the foamed region, and
wherein at least the cell layer in the foamed region is formed of a thermosetting resin.

2. The inverter surge-resistant insulated wire according to claim 1, wherein a relative dielectric constant at 200° C. of the enamel resin-insulating laminate is 3.0 or less.

3. The inverter surge-resistant insulated wire according to claim 1, wherein a thickness of the enamel resin-insulating laminate is 40 μm or more, and a thickness of at least one of the non-foamed regions is 10 μm or more.

4. The inverter surge-resistant insulated wire according to claim 1, wherein a maximum cell diameter of the cells in a thickness direction is less than 20 μm.

5. The inverter surge-resistant insulated wire according to claim 1, wherein the enamel resin-insulating laminate has a surface layer formed of a resin having a tensile elasticity at 25° C. of 1 GPa or more.

6. The inverter surge-resistant insulated wire according to claim 5, wherein the surface layer includes at least one kind of thermoplastic resin selected from a polyether ether ketone resin, a thermoplastic polyimide resin, a polyphenylene sulfide resin, a polyesterimide resin and a polyamide resin.

7. The inverter surge-resistant insulated wire according to claim 1, wherein the foamed region includes at least one kind of thermosetting resin selected from a polyamideimide resin and a polyimide resin.

8. The inverter surge-resistant insulated wire according to claim 1, wherein the non-foamed region includes at least one kind of thermosetting resin selected from a polyimide resin, a polyamideimide resin, a polyesterimide resin, a polyetherimide resin and a polyimidehydantoin-modified polyester resin.

9. The inverter surge-resistant insulated wire according to claim 1, wherein the enamel resin-insulating laminate further comprises at least one kind of particles selected from alumina, silica and titania.

10. The inverter surge-resistant insulated wire according to claim 1, wherein the non-foamed region is formed of a thermoplastic resin and a degree of crystallinity in the non-foamed region formed of the thermoplastic resin is 50% or more.

11. The inverter surge-resistant insulated wire according to claim 1, wherein the non-foamed region is arranged on a peripheral surface side.

12. Electric/electronic equipment, comprising the inverter surge-resistant insulated wire according to claim 11.

13. A motor, comprising the inverter surge-resistant insulated wire according to claim 11.

14. A transformer, comprising the inverter surge-resistant insulated wire according to claim 11.

* * * * *